United States Patent
Pettersson et al.

(10) Patent No.: US 12,192,528 B2
(45) Date of Patent: Jan. 7, 2025

(54) SIGNALING OF ACCESS UNIT DELIMITER

(71) Applicant: Telefonaktiebolaget LM Ericsson (publ), Stockholm (SE)

(72) Inventors: Martin Pettersson, Vallentuna (SE); Mitra Damghanian, Upplands-Bro (SE); Rickard Sjöberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 103 days.

(21) Appl. No.: 17/626,483

(22) PCT Filed: Jul. 8, 2020

(86) PCT No.: PCT/EP2020/069304
§ 371 (c)(1),
(2) Date: Jan. 11, 2022

(87) PCT Pub. No.: WO2021/008979
PCT Pub. Date: Jan. 21, 2021

(65) Prior Publication Data
US 2022/0286710 A1    Sep. 8, 2022

Related U.S. Application Data

(60) Provisional application No. 62/873,812, filed on Jul. 12, 2019.

(51) Int. Cl.
*H04N 19/70* (2014.01)
*H04N 19/169* (2014.01)

(52) U.S. Cl.
CPC .......... *H04N 19/70* (2014.11); *H04N 19/188* (2014.11)

(58) Field of Classification Search
CPC ....... H04N 19/188; H04N 19/46; H04N 19/70
See application file for complete search history.

(56) References Cited

U.S. PATENT DOCUMENTS

2016/0156968 A1* 6/2016 Toma .................. H04N 9/8211
386/248
2016/0234527 A1* 8/2016 Rodriguez ............ H04N 19/46
(Continued)

OTHER PUBLICATIONS

Sjöberg et al. ("AHG17: Picture header NAL unit type", 13. JVET Meeting; Jan. 9, 2019-Jan. 18, 2019; Marrakech; The Joint Video Exploration Team of ISO/IEC JTC1/SC29/WG11 and ITU-T SG.16; No. JVET-M0377) (Year: 2019).*

(Continued)

*Primary Examiner* — Maria E Vazquez Colon
(74) *Attorney, Agent, or Firm* — Sage Patent Group

(57) ABSTRACT

A method performed by a decoder to decode a bitstream and a decoder is provided. One or more syntax elements are decoded from the bitstream. A first value is derived from the one or more syntax elements. The first value is compared to a predetermined set of values that comprises at least two values. Whether the first value is within a predetermined range of values in the predetermined set of values is determined. Responsive to determining the first value is within the predetermined range of values in the predetermined set of values, it is determined that a location of an access unit boundary is indicated. Analogous methods performed by an encoder and an encoder are also provided.

12 Claims, 10 Drawing Sheets

(56) References Cited

U.S. PATENT DOCUMENTS

2016/0366428 A1* 12/2016 Deshpande ............ H04N 19/30
2022/0239949 A1* 7/2022 Hannuksela ......... H04N 21/435

OTHER PUBLICATIONS

Wang ("AHG8/AHG: On IRAP and GDR AUs", Joint Video Experts Team (JVET) of ITU-T SG 16 WP 3 and ISO/IEC JTC 1/SC 29/WG 11; 18th Meeting: by teleconference, Apr. 15-24, 2020; Document: JVET-R0065-v1) (Year: 2020).*

International Search Report and Written Opinion of the International Searching Authority, PCT/EP2020/069304, mailed Nov. 17, 2020, 25 pages.

"Working Draft 5 of Versatile Video Coding", No. n18370, Jul. 7, 2019 (Jul. 7, 2019), 126. MPEG Meeting; Mar. 25, 2019-Mar. 29, 2019; Geneva; (Motion Picture Expert Group or ISO/IEC JTC1/SC29/WG11), Retrieved from the Internet: URL:http://phenix.int-evry.fr/mpeg/doc_end_user/documents/126_Geneva/wg11/w18370.zip_w18370.docx (XP030222340) [retrieved on Jul. 7, 2019] 406 pages.

Heng (Broadcom) B et al, "AHG17: Association of VCL NAL units to coded pictures", No. JVET-O0610, Jun. 26, 2019 (Jun. 26, 2019), 15. JVET Meeting; Jul. 3, 2019-Jul. 12, 2019; Gothenburg; (The Joint Video Exploration Team of ISO/IEC JTC1/SC29/WG11 and ITU-T SG.16 ), Retrieved from the Internet: URL:http://phenix.int-evry.fr/jvet/doc_end_user/documents/15_Gothenburg/wg11/JVET-O0610-v1.zip_JVET-O0610.DOCX (XP030220036) [retrieved on Jun. 26, 2019] 3 pages.

Hannuksela (Nokia) M M, "Version 1/MV-HEVC/SHVC HLS: Access unit boundary detection", No. JCT3V-G0032, Dec. 19, 2013 (Dec. 19, 2013), 7. JCT-3V Meeting; Jan. 11, 2014-Jan. 17, 2014; San Jose; (The Joint Collaborative Team on 3D Video Coding Extension Development of ISO/IEC JTC1/SC29/WG11 and ITU-T SG.16), Retrieved from the Internet: URL:http://phenix.int-evry.fr/jct2/doc_end_user/documents/7_San%20Jose/wg11/JCT3V-G0032-v1.zip_JCTVC-P0043_JCT3V-G0032.doc (XP030131775) [retrieved on Jan. 13, 2014] 4 pages.

Sjöberg (Ericsson) R et al, "AHG17: Picture header NAL unit type", No. JVET-M0377, Jan. 12, 2019 (Jan. 12, 2019), 13. JVET Meeting; Jan. 9, 2019-Jan. 18, 2019; Marrakech; (The Joint Video Exploration Team of ISO/IEC JTC1/SC29/WG11 and ITU-T SG.16 ), Retrieved from the Internet: URL:http://phenix.int-evry.fr/jvet/doc_end_user/documents/13_Marrakech/wg11/JVET-M0377-v3.zip_JVET-M0377-v2.docx (XP030201783) [retrieved on Jan. 12, 2019] 8 pages.

"Study Text of ISO/IEC 13818-1:200/FPDAM3", No. n5605, Apr. 10, 2003 (Apr. 10, 2003), 64. MPEG Meeting; Mar. 10, 2003-Mar. 14, 2003; Pattaya; (Motion Picture Expert Group or ISO/IEC JTC1/SC29/WG11), Retrieved from the Internet: URL:http://phenix.int-evry.fr/mpeg/doc_end_user/documents/64_Pattaya/wg11/w5605.zip W5605.doc (XP030279255) [retrieved on Aug. 27, 2010] 13 pages.

Bross, B., "Versatile Video Coding (Draft 5)," Joint Video Experts Team (JVET), of ITU-T SG 16 WP 3 and ISO/IEC JTC 1/SC 29/WG 11, 14th Meeting: Geneva, CH, Mar. 19-27, 2019, Document: JVET-N1001-v7v8, 400 pages.

Bross, B., "Versatile Video Coding (Draft 5)," Joint Video Experts Team (JVET), of ITU-T SG 16 WP 3 and ISO/IEC JTC 1/SC 29/WG 11, 14th Meeting: Geneva, CH, Mar. 19-27, 2019, Document: JVET-N1001-v9v10, 407 pages.

Deshpande, S., "On NAL Unit Header Design," Joint Video Experts Team (JVET), of ITU-T SG 16 WP 3 and ISO/IEC JTC 1/SC 29/WG 11, 15th Meeting: Gothenburg, SE, Jul. 3-12, 2019, Document: JVET-O0179-v2, 11 pages.

Wang, Y-K., "AHG17: On AL unit header," Joint Video Experts Team (JVET), of ITU-T SG 16 WP 3 and ISO/IEC JTC 1/SC 29/WG 11, 15th Meeting: Gothenburg, SE, Jul. 3-12, 2019, Document: JVET-O1037-v1, 4 pages.

* cited by examiner

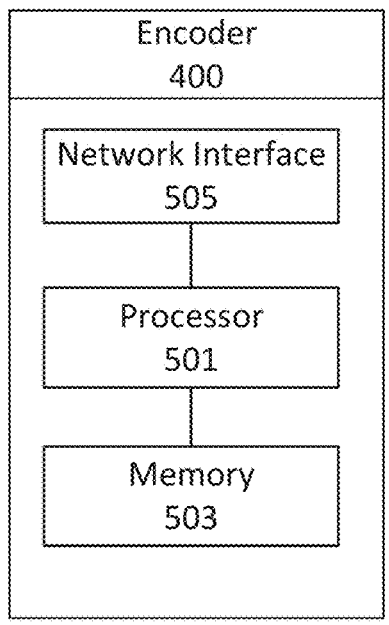

Figure 5

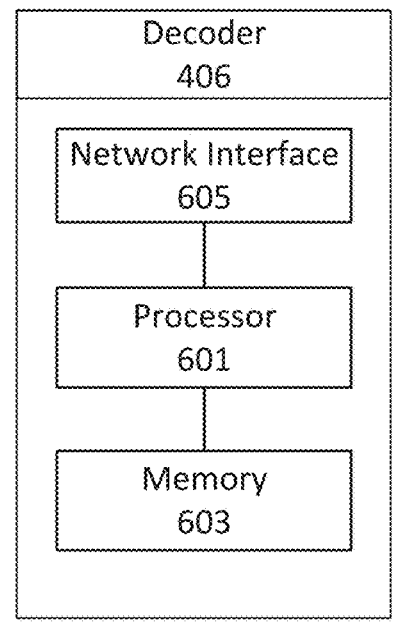

Figure 6

Decoding a value of a network abstraction layer, NAL, unit type in a NAL unit header of a NAL unit of a coded video stream, CVS
1000

Determining whether the value indicates that AUD NAL units are present in access units following a current access unit in decoding or in the CVS
1002

Figure 10

Determining whether every access unit starts with an AUD NAL unit
1700

Responsive to determining that every access unit starts with an AUD NAL unit, encoding a codeword in a first NAL unit of a coded video stream that specifies that AUDs are present in every access unit in decoding order
1702

Figure 17

Decoding a value of a syntax element in a parameter set, the value indicating whether there are AUD NAL units in access units following a current access unit in decoding order in a CVS
2100

Determining whether the value indicates that there are AUD NAL units in the access unit following the current access unit in decoding order in the CVS
2102

Determining from a syntax element in the parameter set a number of NAL units in a first access unit.
2104

Figure 21

Determining whether AUD NAL units are to be present in access units following a current access unit in decoding order in a coded video stream
2200

Responsive to determining that AUD NAL units are to be present in access units following the current access unit in decoding order, encodinga value of a syntax element in parameter set of a the coded video stream, the value indicating that there are AUD NAL units in access units following the current access unit in decoding order
2202

Encoding a value of a second syntax element in the parameter set, the value of the second syntax element indicating a number of NAL units in a first access unit
2204

Figure 22

SIGNALING OF ACCESS UNIT DELIMITER

CROSS REFERENCE TO RELATED APPLICATIONS

This application is a 35 U.S.C. § 371 national stage application of PCT International Application No. PCT/EP2020/069304 filed on Jul. 8, 2020, which in turn claims domestic priority to U.S. Provisional Patent Application No. 62/873,812, filed on Jul. 12, 2019, the disclosures and content of which are incorporated by reference herein in their entirety.

TECHNICAL FIELD

The application relates to methods and apparatuses for video encoding and decoding.

BACKGROUND

HEVC and VVC

High Efficiency Video Coding (HEVC) is a block-based video codec standardized by the ITU-T (Telecommunication Standardization Sector of the International Telecommunications Union) and the MPEG (Moving Pictures Expert Group) that utilizes both temporal and spatial prediction. Spatial prediction is achieved using intra (I) prediction from within the current picture. Temporal prediction is achieved using uni-directional (P) or bi-directional inter (B) prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

The MPEG and the ITU-T are working on the successor to HEVC within the Joint Video Exploratory Team (JVET). The name of this video codec under development is Versatile Video Coding (VVC).

Components

A video sequence consists of a series of images where each image consists of one or more components. Each component can be described as a two-dimensional rectangular array of sample values. Typically, an image in a video sequence consists of three components: one luma component Y where the sample values are luma values and two chroma components Cb and Cr, where the sample values are chroma values. Typically, the dimensions of the chroma components are smaller than the luma components by a factor of two in each dimension. For example, the size of the luma component of a High Density (HD) image would be 1920×1080 and the chroma components would each have the dimension of 960×540. Chroma components are sometimes referred to as color components.

Blocks and Units

A block is a two-dimensional array of samples. In video coding, each component is split into blocks and the coded video bitstream consists of a series of blocks. Typically, in video coding, the image is split into units that cover a specific area of the image. Each unit consists of all blocks from all components that make up that specific area and each block belongs to one unit. The macroblock in H.264 and the Coding Unit (CU) in High Efficiency Video Coding (HEVC) are examples of units.

A block can alternatively be defined as a two-dimensional array that a transform used in coding is applied to. These blocks are referred to under the name "transform blocks". Alternatively, a block can be defined as a two-dimensional array that a single prediction mode is applied to. These blocks can be called "prediction blocks." In this application, the term "block" is not tied to any particular one of these definitions as the description herein can apply to either definition.

NAL Units

Both HEVC and VVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC begins with a header called the NAL unit header. The syntax for the NAL unit header for HEVC is shown in Table 1 and starts with a forbidden_zero_bit that shall always be equal to 0 to prevent start code emulations. Without it, some MPEG systems might confuse the HEVC video bitstream with other data, but the 0 bit in the NAL unit header makes all possible HEVC bitstreams uniquely identifiable as HEVC bitstreams. The nal_unit_type, nuh_layer_id and nuh_temporal_id_plus1 code words specify the NAL unit type of the NAL unit that identifies what type of data is carried in the NAL unit, the layer ID and the temporal ID for which the NAL unit belongs to. The NAL unit type indicates and specifies how the NAL unit should be parsed and decoded.

The rest of the bytes of the NAL unit is payload of the type indicated by the NAL unit type. A bitstream consists of a series of concatenated NAL units.

TABLE 1

HEVC NAL unit header syntax (design A)

|  | Descriptor |
| --- | --- |
| Nal_unit_header( ) { |  |
| forbidden_zero_bit | f(1) |
| nal_unit_type | u(6) |
| nuh_layer_id | u(6) |
| nuh_temporal_id_plus1 | u(3) |
| } |  |

The syntax for the NAL unit header in the current version of the VVC draft, JVET-N1001-v8, is shown in Table 2.

TABLE 2

NAL unit header syntax for current version of VVC draft (design B)

|  | Descriptor |
| --- | --- |
| Nal_unit_header( ) { |  |
| zero_tid_required_flag | u(1) |
| nuh_temporal_id_plus1 | u(3) |
| nal_unit_type_lsb | u(4) |
| nuh_layer_id | u(7) |
| nuh_reserved_zero_bit | u(1) |
| } |  |

At the 15th JVET meeting in Gothenburg, three different NAL unit header designs were presented and discussed.

They are shown in Table 3, Table 4, and Table 5. The NAL unit header design in Table 4 was selected for the next version of the VVC draft.

TABLE 3

NAL unit header syntax from JVET document JVET-O0179 (design C)

| | Descriptor |
|---|---|
| Nal_unit_header( ) { | |
| nuh_layer_id | u(8) |
| nal_unit_type | u(5) |
| nuh_temporal_id_plus1 | u(3) |
| } | |

TABLE 4

NAL unit header syntax from JVET document JVET-O0179 (design D)

| | Descriptor |
|---|---|
| nal_unit_header( ) { | |
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

TABLE 5

NAL unit header syntax from JVET document JVET-O1037 (design E)

| | Descriptor |
|---|---|
| nal_unit_header( ) { | |
| forbidden_zero_bit | f(1) |
| nuh_layer_id | u(6) |
| nal_unit_type | u(5) |
| nuh_temporal_id_plus1 | u(3) |
| nuh_reserved_zero_bit | u(1) |
| } | |

In all five NAL unit header designs presented above, design A to design E, the number of layers is limited. It may therefore be beneficial to incorporate an extension mechanism for the NAL unit header such that the number of layer ID values for the NAL units can be increased. This is provided for the NAL unit headers designs above as follows:

In design A, the nuh_layer_id value of 63 is reserved to provide a layer extension mechanism. The idea is that if the value of 63 is 4ignaled, there is more data following the NAL unit header that contains a longer layer ID.

Design B is the same as in design A, but the value 127 for nuh_layer_id_plus1 is reserved instead of 63.

Design C reserves values 127-187 that can be used to extend the number of layers.

Design D is similar but reserves values 32-63.

In Design E, it may be possible to use nuh_reserved_zero_bit as an extension. The value of 1 is reserved and can be used to extend the range of layer_id by adding additional NAL unit header extension bytes after then NAL unit header where the NAL unit header extension bytes are used to carry layer ID values.

A decoder or bitstream parser can conclude how the NAL unit should be handled, e.g. parsed and decoded, after looking at the NAL unit header. The rest of the bytes of the NAL unit is payload of the type indicated by the NAL unit type. A bitstream consists of a series of concatenated NAL units.

The NAL unit type indicates and defines how the NAL unit should be parsed and decoded. A VCL NAL unit provides information about the picture type of the current picture. The NAL unit types of the current version of the VVC draft are shown in Table 6.

TABLE 6

NAL unit types in the current version of the VVC draft

| NalUnit-Type | Name of NalUnitType | Content of NAL unit and RBSP syntax structure | NAL unit type class |
|---|---|---|---|
| 0 | PPS_NUT | Picture parameter set pic_parameter_set_rbsp( ) | non-VCL |
| 1 | AUD_NUT | Access unit delimiter access_unit_delimiter_rbsp( ) | non-VCL |
| 2 | PREFIX_SEI_NUT | Supplemental enhancement information sei_rbsp( ) | non-VCL |
| 3 | SUFFIX_SEI_NUT | | |
| 4 | APS_NUT | Adaptation parameter set adaptation_parameter_set_rbsp( ) | non-VCL |
| 5..7 | RSV_NVCL5..RSV_NVCL7 | Reserved | non-VCL |
| 8 | TRAIL_NUT | Coded slice of a non-STSA trailing picture slice_layer_rbsp( ) | VCL |
| 9 | STSA_NUT | Coded slice of an STSA picture slice_layer_rbsp( ) | VCL |
| 10 | RADL_NUT | Coded slice of a RADL picture slice_layer_rbsp( ) | VCL |
| 11 | RASL_NUT | Coded slice of a RASL picture slice_layer_rbsp( ) | VCL |
| 12..15 | RSV_VCL12..RSV_VCL15 | Reserved non-IRAP VCL NAL unit types | VCL |
| 16 | DPS_NUT | Decoding parameter set decoding_parameter_set_rbsp( ) | non-VCL |
| 17 | SPS_NUT | Sequence parameter set seq_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20 | VPS_NUT | Video parameter set video_parameter_set_rbsp( ) | non-VCL |
| 21..23 | RSV_NVCL21..RSV_NVCL23 | Reserved | non-VCL |
| 24 | IDR_W_RADL | Coded slice of an IDR picture slice_layer_rbsp( ) | VCL |
| 25 | IDR_N_LP | | |
| 26 | CRA_NUT | Coded slice of a CRA picture slice_layer_rbsp( ) | VCL |

TABLE 6-continued

NAL unit types in the current
version of the VVC draft

| NalUnit-Type | Name of NalUnitType | Content of NAL unit and RBSP syntax structure | NAL unit type class |
|---|---|---|---|
| 27 | GRA_NUT | Coded slice of a gradual random access picture slice_layer_rbsp( ) | VCL |
| 28..31 | UNSPEC28.. UNSPEC31 | Unspecified | non-VCL |

Temporal Layers

In HEVC, all pictures are associated with a TemporalId value which specified what temporal layer the picture belongs to. TemporalID values are decoded from the nuh_temporal_id_plus1 syntax element in the NAL unit header. In HEVC, the encoder is required to set TemporalId values such that pictures belonging to a lower layer is perfectly decodable when higher temporal layers are discarded. Assume for instance that an encoded has output a bitstream using temporal layers 0, 1 and 2. Then removing all layer 2 NAL units or removing all layer 1 and 2 NAL units will result in bitstreams that can be decoded without problems. This is ensured by restrictions in the HEVC specification that the encoder must comply with. For instance, it is not allowed for a picture of a temporal layer to reference a picture of a higher temporal layer.

Layers—Dependent and Independent Layers

Layers are defined in VVC as a set of VCL NAL units that all have a particular value of NuhLayerId and the associated non-VCL NAL units.

A layer access unit in VVC is defined as a set of NAL units for which the VCL NAL units all have a particular value of NuhLayerId, that are associated with each other according to a specified classification rule, that are consecutive in decoding order, and that contain exactly one coded picture.

A coded layer video sequence (CLVS) in the current version of VVC is defined as a sequence of layer access units that consists, in decoding order, of a CLVS start (CLVSS) layer access unit, followed by zero or more layer access units that are not CLVSS layer access units, including all subsequent layer access units up to but not including any subsequent layer access unit that is a CLVSS layer access unit.

The relation between the layer access units and coded layer video sequences is illustrated in FIG. 1.

In the current version of VVC, layers are coded independently from each other, i.e. a layer with e.g. NuhLayerId 0 may not predict video data from another layer with e.g. NuhLayerId 1. For the next version of the VVC draft, scalability support was adopted, which allows dependent coding between layers.

Access Units and the Access Unit Delimiter

For single layer coding in HEVC and the current VVC draft, an access unit (AU) is the coded representation of a single picture. An AU may consist of several video coding layer (VCL) NAL units as well as non-VCL NAL units. An access unit may optionally start with an access unit delimiter (AUD) NAL unit which indicates the start of the access unit and the type of the slices allowed in the picture, i.e. I, I-P or I-P-B. In the current version of the VVC draft, the access unit delimiter has NAL unit type 1 with the name AUD NUT.

The tentative decision from the 15th JVET meeting in Gothenburg, is to mandate AUD for each picture, i.e. an AUD NAL unit must be sent as the first NAL unit in each access unit. The syntax and semantics for the access unit delimiter NAL unit in the current version of the VVC draft is shown below in Table 7.

TABLE 7

Access unit delimiter RBSP syntax in the current
version of the VVC draft

| | Descriptor |
|---|---|
| access_unit_delimiter_rbsp() { | |
|   pic_type | u(3) |
|   rbsp_trailing_bits( ) | |
| } | |

Access Unit Delimiter RBSP Semantics

The access unit delimiter may be used to indicate the type of slices present in the coded pictures in the access unit containing the access unit delimiter NAL unit and to simplify the detection of the boundary between access units. There is no normative decoding process associated with the access unit delimiter.

pic_type indicates that the slice_type values for all slices of the coded pictures in the access unit containing the access unit delimiter NAL unit are members of the set listed in Table 7 3 for the given value of pic_type. The value of pic_type shall be equal to 0, 1 or 2 in bitstreams conforming to this version of this Specification. Other values of pic_type are reserved for future use by ITU T|ISO/IEC. Decoders conforming to this version of this specification shall ignore reserved values of pic_type.

TABLE 7-3

Interpretation of pic_type

| pic_type | slice_type values that may be present in the coded picture |
|---|---|
| 0 | I |
| 1 | P, I |
| 2 | B, P, I |

Intra random access point (IRAP) pictures and the coded video sequence (CVS)

An intra random access point (IRAP) picture in HEVC is a picture that does not refer to any pictures other than itself for prediction in its decoding process. The first picture in the bitstream in decoding order in HEVC must be an IRAP picture but an IRAP picture may additionally also appear later in the bitstream. HEVC specifies three types of IRAP pictures, the broken link access (BLA) picture, the instantaneous decoder refresh (IDR) picture and the clean random access (CRA) picture A coded video sequence (CVS) in HEVC is a series of access units starting at an IRAP access unit up to, but not including the next IRAP access unit in decoding order.

IDR pictures always start a new CVS. An IDR picture may have associated random access decodable leading (RADL) pictures. An IDR picture does not have associated RASL pictures.

BLA pictures also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not defined in the current version of VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may start a CVS.

In the current version of the VVC draft, a CVS is started at a CVS start (CVSS) access unit, which may contain an IRAP picure, i.e, an IDR or a CRA picture, or a gradual decoding access (GRA) picture.

GRA pictures are essentially used for random access in bitstreams encoded for low-delay coding where a full IRAP picture would cause too much delay. A GRA picture may use gradual intra refresh that updates the video picture by picture where each picture is only partially intra coded. It is signaled with the GRA picture when the video is fully refreshed and ready for output, given that the bitstream was tuned into at the GRA picture. A GRA may start a CVS.

Parameter Sets

HEVC and VVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSs.

The current version of VVC also specifies two additional parameter sets, the adaptation parameter set (APS) and the decoder parameter set (DPS).

APS carries parameters needed for the adaptive loop filter (ALF) tool and the luma mapping and chroma scaling (LMCS) tool.

DPS specifies information that may not change during the decoding session and may be good for the decoder to know about, e.g. the maximum number of allowed sub-layers. The information in DPS is not necessary for operation of the decoding process.

SUMMARY

In contrast to the current version of VVC where it was optional to start an access unit with an AUD NAL unit, the decision from the 15th JVET meeting is to mandate an AUD NAL unit to start each access unit in the bitstream. This adds an additional bit cost to each picture in the bitstream. In the current version of the VVC draft, the AUD NAL unit has a 2 byte NAL unit header followed by the 3 bit pic_type code word and 5 byte alignment bits. Thus, 3 bytes extra is needed for each access unit.

One problem is the case where there is only one slice per picture or, more specifically only one NAL unit per picture apart from the AUD NAL unit. There may also be only one picture in the access unit. It then seems unnecessary to send an AUD NAL unit for each picture.

According to some embodiments of inventive concepts, a method performed by a decoder to decode a bitstream is provided. The method includes decoding one or more syntax elements from the bitstream. The method includes deriving a first value from the one or more syntax elements. The method includes comparing the first value to a predetermined set of values that comprises at least two values. The method includes determining whether the first value is within a predetermined range of values in the predetermined set of values. The method includes responsive to determining the first value is within the predetermined range of values in the predetermined set of values, determining that a location of an access unit boundary is indicated. Analogous decoder embodiments are also provided.

According to other embodiments of inventive concepts, a method performed by a decoder is provided. The method includes decoding a codeword from a network abstraction layer (NAL) unit header of a first NAL unit. The method includes determining whether the codeword indicates a start of an access unit by: determining that the first NAL unit is a first NAL unit of an access unit responsive to the codeword being equal to one or more specified values, and determining that the first NAL unit is not a first NAL unit of an access unit responsive to the codeword being equal to one or more different specified values. Analogous decoder embodiments are also provided.

According to yet other embodiments of inventive concepts, a method performed by a decoder is provided. The method includes decoding a value from a syntax element in a parameter set, the value indicating whether or not there are access unit delimiter, AUD, network abstraction layer, NAL units in the access units following the current access unit in decoding order in the coded video stream, CVS. The method includes determining whether the value indicates that there are AUD NAL units in the access units following the current access unit in decoding order in the CVS.

One advantage that may be provided by the inventive concepts include saving bits as the AUD does not need to be signaled in all cases.

According to additional embodiments of inventive concepts, a method performed by an encoder is provided. The method includes determining whether an access unit boundary is being encoded. The method includes responsive to an access unit boundary being encoded, encoding one or more syntax values in a bitstream, with a first value of the one or more syntax values indicating a location of the access unit boundary.

According to yet other embodiments of inventive concepts, a method performed by an encoder is provided. The method includes determining whether access unit delimiter (AUD) network abstraction layer (NAL) units are to be present in access units following a current access unit in decoding order. The method includes responsive to determining that AUD NAL units are to be present, encoding a value of a NAL unit type in a NAL unit header of a NAL unit in a video stream being encoded to indicate that AUD NAL units are to be present in access units following the current access unit in decoding order.

According to further embodiments of inventive concepts, a further method performed by an encoder is provided. The method includes determining whether access unit delimiter (AUD) network abstraction layer (NAL) units are to be present in access units following a current access unit in decoding order in a coded video stream (CVS). The method includes responsive to determining that AUD NAL units are to be present in access units following the current access unit in decoding order, encoding a value of a syntax element in a parameter set of the coded video stream, the value indicating that there are AUD NAL units in access units following the current access unit in decoding order. Analogous encoder embodiments are also provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 5 is a block diagram is a block diagram illustrating an encoder according to some embodiments;

FIG. 6 is a block diagram illustrating a decoder according to some embodiments;

FIGS. 7-13 are flow charts illustrating operations of a decoder in accordance with some embodiments of inventive concepts;

FIGS. 14-20 are flow charts illustrating operations of an encoder in accordance with some embodiments of inventive concepts;

FIG. 21 is a flow chart illustrating operations of a decoder in accordance with some embodiments of inventive concepts; and FIG. 22 is a flow chart illustrating operations of an encoder in accordance with some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In the disclosure that follows, codewords and syntax elements may be used interchangeably and the following terminology is used:

NAL unit header: The entire NAL unit header, which may be one or more bytes

Figure 1:
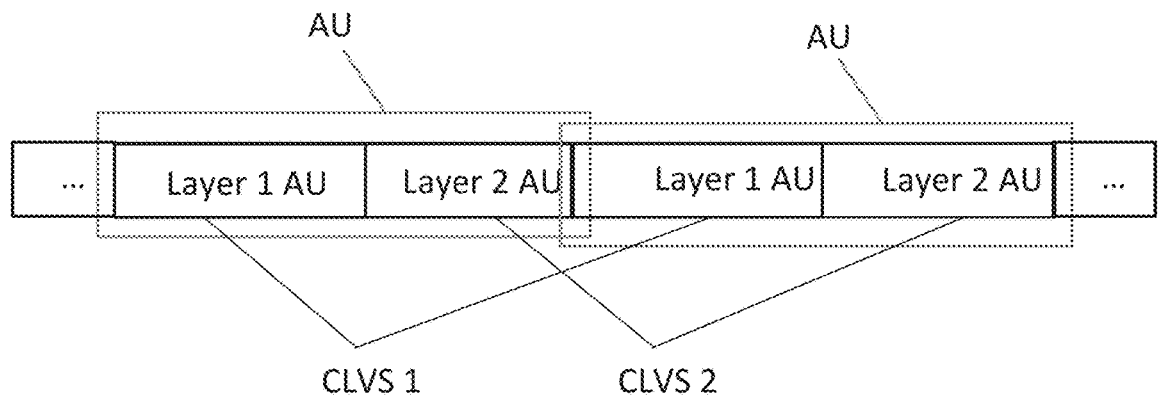
FIG. 1 is a diagram illustrating the relation between layer access units and coded layer sequences (CLVS)
Figure 2:
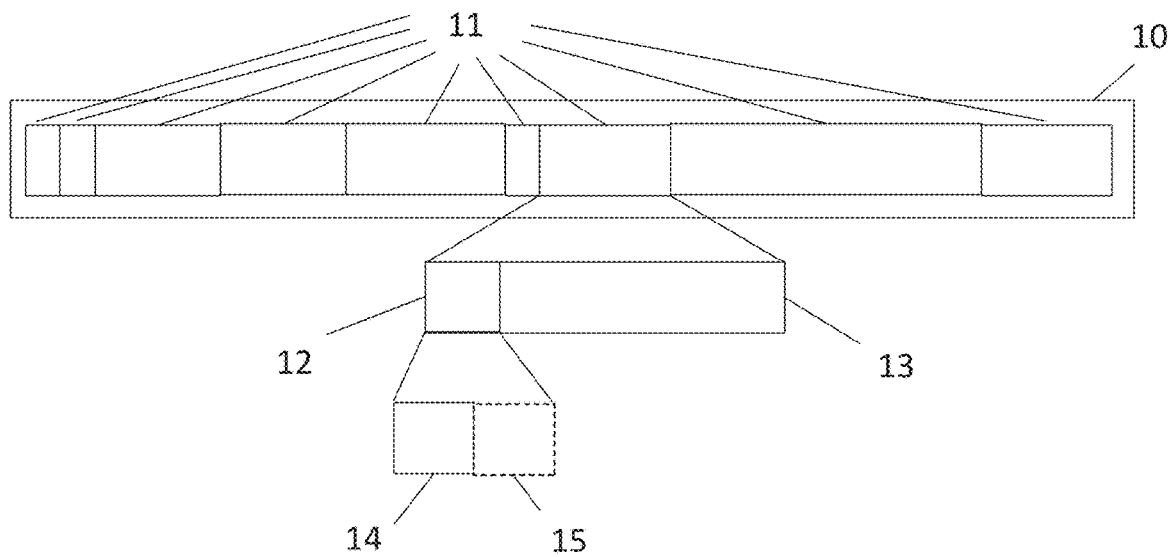
FIG. 2 is a block diagram illustrating a bitstream and the relationship between a bitstream, NAL units, NAL unit headers, NAL unit payloads, and the first part and the extension of a NAL unit header according to some embodiments of inventive concepts.

First part of the NAL unit header: The part of the NAL unit header that is always present NAL unit header extension: The part of the NAL unit header that is not always present Access unit delimiter An indicator that indicates the beginning or the end of an access unit This terminology is further illustrated in FIG. 2. A bitstream 10 comprises one or more NAL units 11. Each NAL unit consists of a NAL unit header 12 and a NAL unit payload 13. A NAL unit may be either a VCL NAL unit where the payload comprises compressed video sample data, e.g. slice data, or a non-VCL NAL unit where the payload, if present, comprises non-VCL data that may be used in the decoding process, e.g. parameter set data, or be used to inform the decoder of things not related to the decoding process, e.g. SEI messages. A NAL unit may comprise a NAL unit header (14) that is always present and a second optional part, a NAL unit header extension (15) that is not always present. In the preferred solution a flag is signaled in the NAL unit header indicating whether the NAL unit is an access unit delimiter or not.

Figure 4:
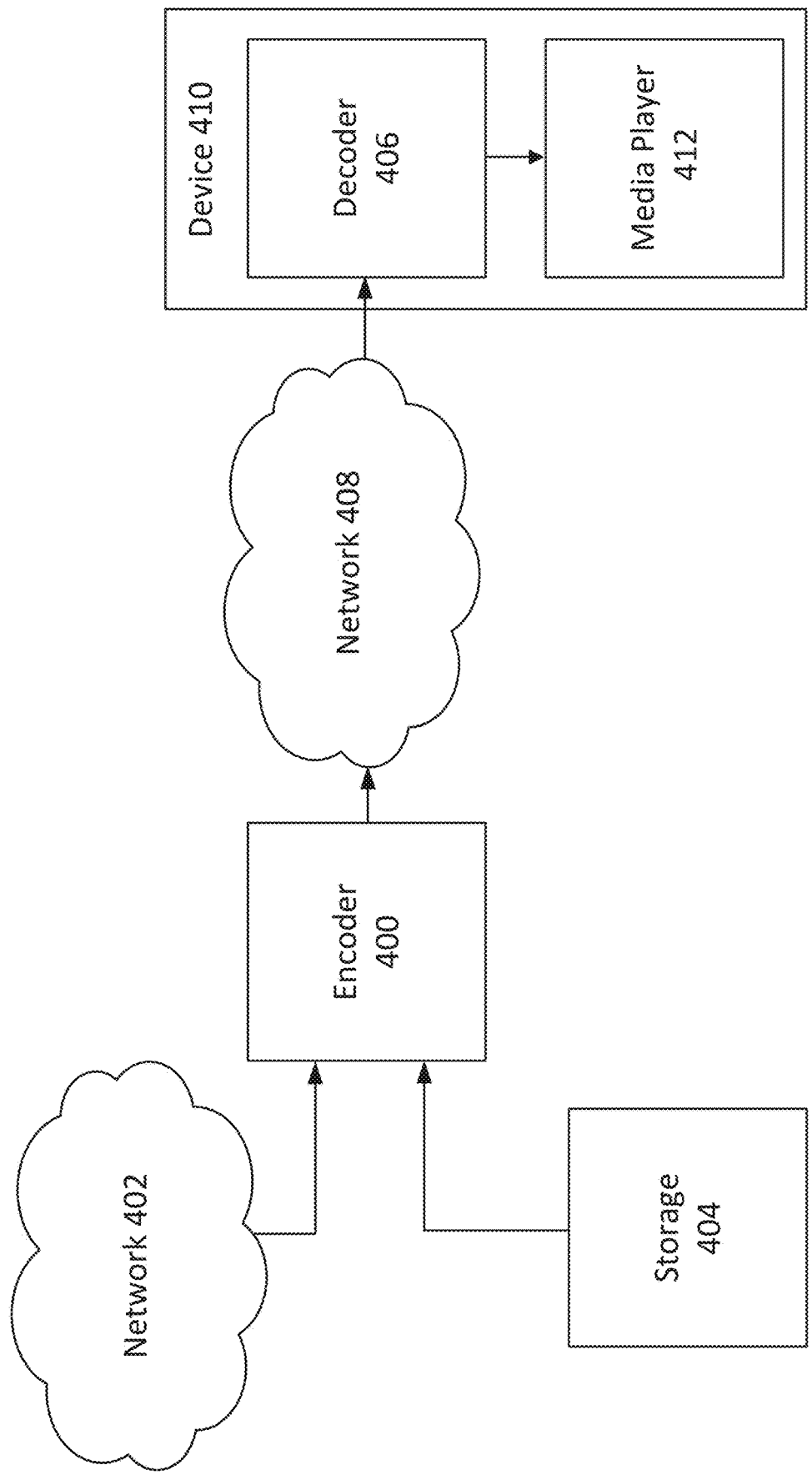
FIG. 4 is a block diagram illustrating an example of an environment of a system in which the encoder and decoder may be implemented according to some embodiments of inventive concepts.

Prior to describing the embodiments in further detail, FIG. 4 illustrates an example of an operating environment of an encoder 400 that may be used to encode bitstreams as described herein. The encoder 400 receives video from network 402 and/or from storage 404 and encodes the video into bitstreams as described below and transmits the encoded video to decoder 406 via network 408. Storage device 404 may be part of a storage depository of multi-channel audio signals such as a storage repository of a store or a streaming video service, a separate storage component, a component of a mobile device, etc. The decoder 406 may be part of a device 410 having a media player 412. The device 410 may be a mobile device, a set-top device, a desktop computer, and the like.

FIG. 5 is a block diagram illustrating elements of encoder 400 configured to encode video frames according to some embodiments of inventive concepts. As shown, encoder 400 may include a network interface circuit 505 (also referred to as a network interface) configured to provide communications with other devices/entities/functions/etc. The encoder 400 may also include a processor circuit 501 (also referred to as a processor) coupled to the network interface circuit 505, and a memory circuit 503 (also referred to as memory) coupled to the processor circuit. The memory circuit 503 may include computer readable program code that when executed by the processor circuit 501 causes the processor circuit to perform operations according to embodiments disclosed herein.

According to other embodiments, processor circuit 501 may be defined to include memory so that a separate memory circuit is not required. As discussed herein, operations of the encoder 400 may be performed by processor 501 and/or network interface 305. For example, processor 501 may control network interface 305 to transmit communications to decoder 406 and/or to receive communications through network interface 305 from one or more other network nodes/entities/servers such as other encoder nodes, depository servers, etc. Moreover, modules may be stored in memory 503, and these modules may provide instructions so that when instructions of a module are executed by processor 501, processor 501 performs respective operations.

FIG. 6 is a block diagram illustrating elements of decoder 306 configured to decode video frames according to some embodiments of inventive concepts. As shown, decoder 406 may include a network interface circuit 605 (also referred to as a network interface) configured to provide communications with other devices/entities/functions/etc. The decoder 406 may also include a processor circuit 601 (also referred to as a processor) coupled to the network interface circuit 605, and a memory circuit 603 (also referred to as memory) coupled to the processor circuit. The memory circuit 603 may include computer readable program code that when executed by the processor circuit 601 causes the processor circuit to perform operations according to embodiments disclosed herein.

According to other embodiments, processor circuit 601 may be defined to include memory so that a separate memory circuit is not required. As discussed herein, operations of the decoder 406 may be performed by processor 601 and/or network interface 605. For example, processor 601 may control network interface 605 to receive communications from encoder 400. Moreover, modules may be stored in memory 603, and these modules may provide instructions so that when instructions of a module are executed by processor 601, processor 601 performs respective operations.

In contrast to the current version of VVC where it was optional to start an access unit with an AUD NAL unit, the decision from the 15th JVET meeting is to mandate an AUD NAL unit to start each access unit in the bitstream. This adds an additional bit cost to each picture in the bitstream. In the current version of the VVC draft, the AUD NAL unit has a 2 byte NAL unit header followed by the 3 bit pic_type code word and 5 byte alignment bits. Thus, 3 bytes extra is needed for each access unit.

Another problem is the case where there is only one slice per picture or, more specifically only one NAL unit per picture apart from the AUD NAL unit. There may also be only one picture in the access unit. It then seems unnecessary to send an AUD NAL unit for each picture.

The embodiments described herein describe methods of signaling the AUD that address the problems of the current solutions. It is to be understood by a person skilled in the art that two or more embodiments, or parts of embodiments, may be combined to form new solutions which are still covered by the invention described in this disclosure.

In a first embodiment the AUD may be signaled in the NAL unit header, e.g. as a flag. If the flag is set to 1 then the NAL unit is the first NAL unit of the access unit. If the flag is set to 0, then the NAL unit is not the first NAL unit header of the access unit.

In the first embodiment, the AUD may be signaled directly in the NAL unit header and the NAL unit has a type not solely defined for indicating an AUD NAL unit type with one codeword. If the codeword has one value, the NAL unit is the first NAL unit of the access unit. If the codeword has another value, the NAL unit is not the first NAL unit of the access unit. This embodiment is in contrast with the case where one NAL unit type is dedicated to indicate the start of an access unit in the sense that several NAL unit types can indicate the start of one access unit as long as the codeword is signaled in their NAL unit headers.

Example syntax for the NAL unit header comprising an AUD codeword is shown below.

|  | Descriptor |
|---|---|
| nal_unit_header( ) { | |
| ... | |
| access_unit_delimiter | u(n) |
| ... | |
| } | |

Access_unit_delimiter equal to 1 specifies that the NAL unit is the first NAL unit of the access unit.

In a preferred version of this embodiment, the codeword is a flag. For instance, if the flag is equal to 1, then the NAL unit is the first NAL unit of the access unit. If the flag is equal to 0, then the NAL unit is not the first NAL unit header of the access unit. Alternatively, a flag value of 0 means that the NAL unit is the first NAL unit of the access unit and a flag value of 1 means that it is not.

Example syntax and semantics for the NAL unit header comprising an AUD flag is shown below.

|  | Descriptor |
|---|---|
| nal_unit_header( ) { | |
| ... | |
| access_unit_delimiter_flag | u(1) |
| ... | |
| } | |

Access_unit_delimiter_flag equal to 1 specifies that the NAL unit is the first NAL unit of the access unit. The access_unit_delimiter flag equal to 0 specifies that the NAL unit is not the first NAL unit of the access unit. Alternatively, the access_unit_delimiter flag equal to 1 specifies that the NAL unit is not the first NAL unit of the access unit and the access_unit_delimiter equal to 0 specifies that the NAL unit is the first NAL unit of the access unit.

By signaling AUD directly in the NAL unit header by using a codeword in the NAL unit header where if the codeword has one or more specific values, the NAL unit is the first NAL unit of the access unit and if the codeword has one or more another values, the NAL unit is not the first NAL unit of the access unit, sending a separate NAL unit for the AUD is not needed.

Figure 3:
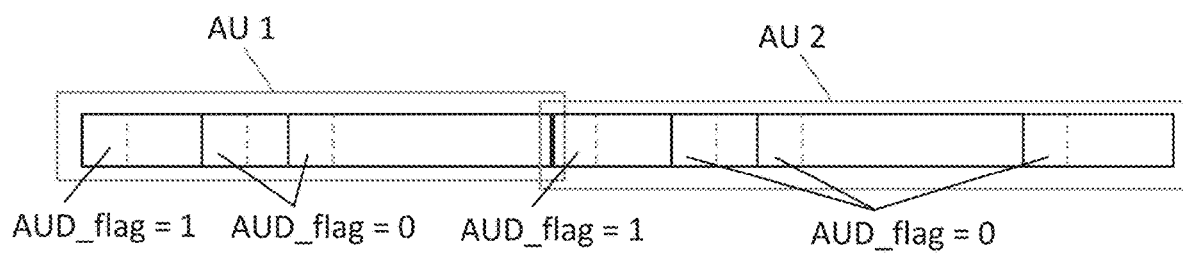
FIG. 3 is a block diagram illustrating a bitstream where the NAL units for which the value of the syntax element ADU flag in the NAL unit header is set to 1 starts an access unit according to some embodiments of inventive concepts.

FIG. 3 illustrates an example of a bitstream where the NAL units for which the value of the syntax element access_unit_delimite_flag in their NAL unit header is equal to 1 starts an access unit and the NAL units that for which the value of the syntax element access_unit_delimiter_flag is equal to 0 in their NAL unit headers are not starting a new access unit.

A decoder may perform all or a subset of the following steps for this embodiment:
Decode a first NAL unit in a CVS
Decode a codeword (e.g. a flag) from the NAL unit header of the first NAL unit
Determine whether the codeword indicates a start of an access unit or not, wherein the decoder determines that the first NAL unit is a first NAL unit of an access unit if the codeword is equal to one or more specific value(s) and the decoder determines that the first NAL unit is not the first NAL unit of an access unit if the codeword is equal to one or more other specific value(s)

An encoder may perform all or a subset of the following steps to encode a current access unit containing one or more pictures according to this embodiment:
Encode and output all NAL units for the current access unit, wherein a codeword in the NAL unit header (e.g. a flag) of the first NAL unit of the current access unit is set to a value that indicates that the NAL unit is the first NAL unit of the access unit
The codewords (e.g. flags) in all NAL unit headers of all NAL units of the current access unit that are not the first NAL unit of the access unit are set to a value that indicates that the NAL units are not the first NAL unit of the access unit In another version of the embodiment, the AUD codeword in the NAL unit header determines if the NAL unit is the first NAL unit of the access unit of the current layer. For instance, if the codeword is a flag and the flag is equal to 1 then the NAL unit is the first NAL unit of the access unit of the current layer. An access unit for a layer may be referred to as a layer access unit. If the flag is equal to 0, then the NAL unit is not the first NAL unit of the access unit of the current layer.

In other versions of this embodiment the AUD codeword in the NAL unit header determines one or more features of the access unit delimiter. The codeword could for instance indicate one or more of the following features:
1. The start of the access unit
2. The end of the access unit
3. The start of a CVS
4. The end of a CVS
5. The first VCL NAL unit in the access unit
6. The last VCL NAL unit in the access unit
7. The start of the access unit of the current layer
8. The end of the access unit of the current layer
9. The number of NAL units in the access unit
10. The number of VCL NAL units in the access unit
11. The number of non-VCL NAL units in the access unit An AUD may be seen as a picture header comprising information that is valid for the whole picture. In one version of the embodiment, the NAL unit header could be signaled with more than two bytes, e. g. three bytes. Applying the proposed method in a three byte NAL unit header scenario compared to the case the NAL unit header is signaled using two bytes but using other than the proposed method such as methods A to E (see Tables 1-5) would then save 1 byte per picture when there is one slice per picture, i.e. it would cost 3 bytes to signal the NAL unit header carrying both the single slice and the AUD codeword with the defined value that specifies that the NAL unit starts an access unit instead of 2 bytes for the NAL unit header carrying the AUD and another 2 bytes for the NAL unit header carrying the single slice. By signaling the NAL unit header with three bytes, it would be possible to fit more information in the NAL unit header In this example the signaling overhead is reduced (by removing the dedicated AUD NAL unit which reduces the number of NAL units) although the length of the NAL unit header is increased.

Figure 7:
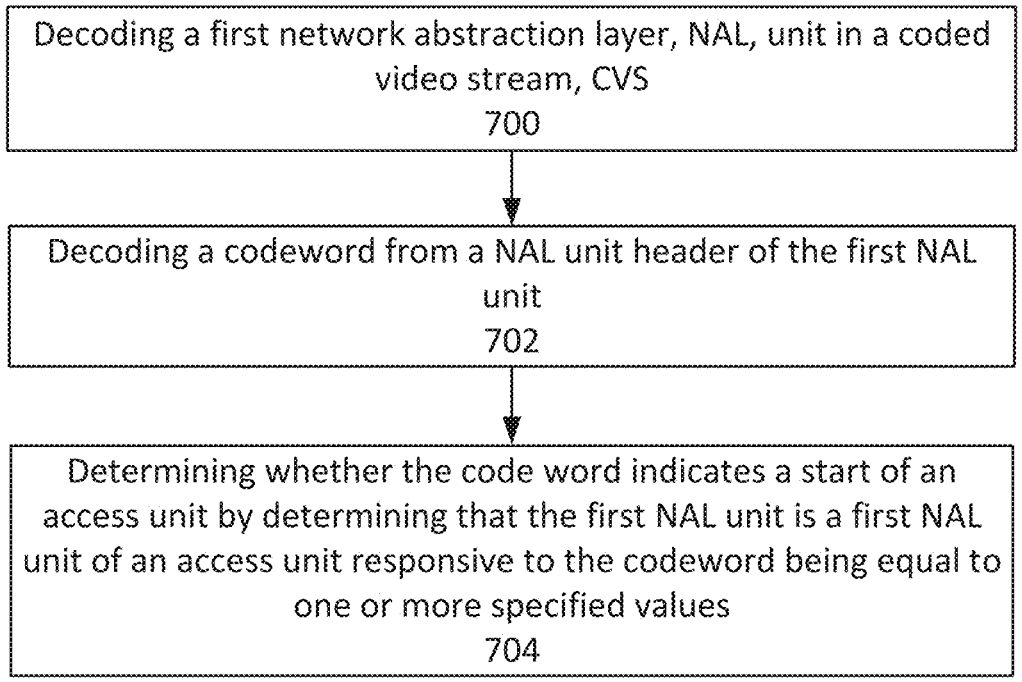

A larger NAL unit header may for instance comprise one or more of the following:
1. More values for representing NAL unit types
2. More values for representing layer ID
3. More values for representing temporal ID
4. The start of the access unit
5. The end of the access unit
6. The start of a CVS
7. The end of a CVS
8. The first VCL NAL unit in the access unit
9. The last VCL NAL unit in the access unit
10. The start of the access unit of the current layer
11. The end of the access unit of the current layer
12. The number of NAL units in the access unit
13. The number of VCL NAL units in the access unit
14. The number of non-VCL NAL units in the access unit FIG. 7 illustrates operations of the decoder 406 in this embodiment. In operation 700, the processing circuitry 601 may decode a first network abstraction layer, NAL, unit in a coded video stream, CVS.

In operation 702, the processing circuitry 601 may decode a codeword from a NAL unit header of the first NAL unit. The codeword may be a flag. The codeword in an embodiment may determine one or more features of the access unit delimiter. The one or more features may be one or more of a start of the access unit, an end of the access unit, a start of a CVS, an end of a CVS, a first VCL NAL unit in the access unit, a last VCL NAL unit in the access unit, a start of the access unit of the current layer, an end of the access unit of the current layer, a number of NAL units in the access unit, a number of VCL NAL units in the access unit, or a number of non-VCL NAL units in the access unit.

In operation 704, the processing circuitry 601 may determine whether the code word indicates a start of an access unit by: determining in operation 708 that the first NAL unit is a first NAL unit of an access unit responsive to the codeword being equal to one or more specified values and responsive to the codeword being equal to one or more other specified values, the processing circuitry 601 in operation 710 may determine that the first NAL unit is not the first NAL unit of an access unit.

Figure 14:
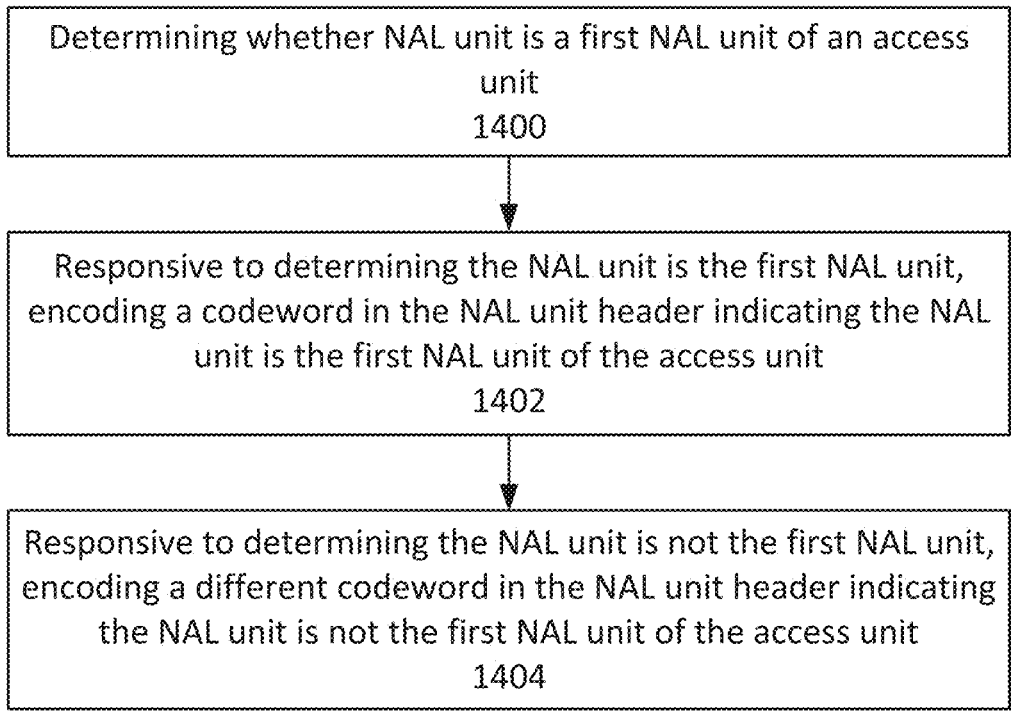

Turning to FIG. 14, operations of encoder 400 in an exemplary embodiment are illustrated. In operation 1400, the processing circuitry 501 may determine whether the network abstraction layer, NAL, unit is a first NAL unit of an access unit. In operation 1402, responsive to determining the NAL unit is the first NAL unit of the access unit, the processing circuitry 501 may encode a codeword in the NAL unit header indicating the NAL unit is the first NAL unit of the access unit. In operation 1404, responsive to determining the NAL unit is not the first NAL unit of the access unit, the processing circuitry 501 may encode a different codeword in the NAL unit header indicating the NAL unit head is not the first NAL unit of the access unit.

In a second embodiment the AUD information may be signaled in the NAL unit payload. In one example of this second embodiment, a first value may be derived from one or more codewords in the payload of the NAL unit such that if the first value is equal to one value or equal to a value in a set of values, the NAL unit is the first NAL unit of the access unit and if the first value is equal to another one value or equal to a value in another set of values, the NAL unit is not the first NAL unit of the access unit. The one or more codewords in the payload may be for example a single flag and the first value may be the value of the flag.

In an example of this embodiment, a fixed position flag in the payload of the NAL unit is used and if the fixed position flag is equal to 1 then the NAL unit starts an access unit and if the fixed position flag is equal to 0 then the NAL unit does not start an access unit in the bitstream.

In a variant of this embodiment, a second fixed position flag is present in the payload of all the NAL units except in the AU delimiter NAL unit and if this second flag is equal to 1, then the NAL unit starts an access unit and if that flag is equal to 0 then the NAL unit does not start an access unit in the bitstream.

In yet another variation of this embodiment, the presence of the one or more codewords in the payload of the NAL unit is conditioned on the value of one or more codewords in other parts of the bit stream such as a flag in the SPS.

Figure 8:
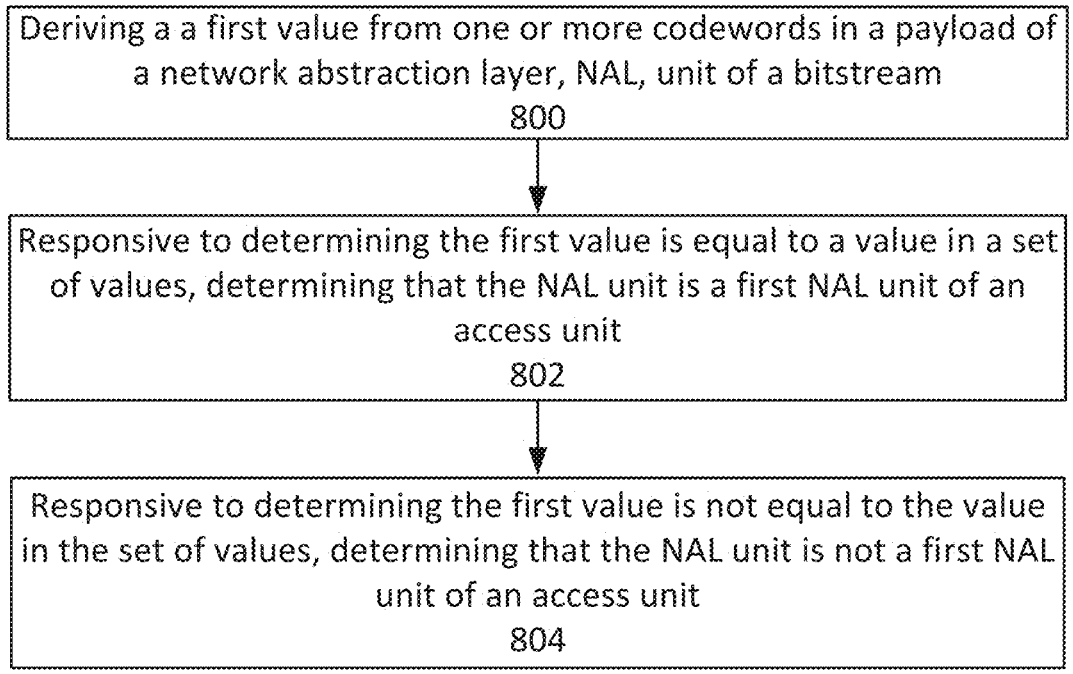

FIG. 8 illustrates operations of the decoder 406 in this embodiment. In operation 800, the processing circuitry 601 may derive a first value from one or more codewords in a payload of a network abstraction layer, NAL, unit of a bitstream. The one or more codewords may be a flag and the first value may be a value of the flag. The presence of the one or more codewords in the payload of the NAL unit may be conditioned on a value of one or more codewords in at least one other part of the bit stream Responsive to determining the first value is equal to a value in a set of values, the processing circuitry 601 in operation 802 may determine that the NAL unit is a first NAL unit of an access unit.

Responsive to determining the first value is not equal to the value in the set of values, the processing circuitry 601 in operation 804 may determine that the NAL unit is not the first NAL unit of the access unit.

Figure 15:
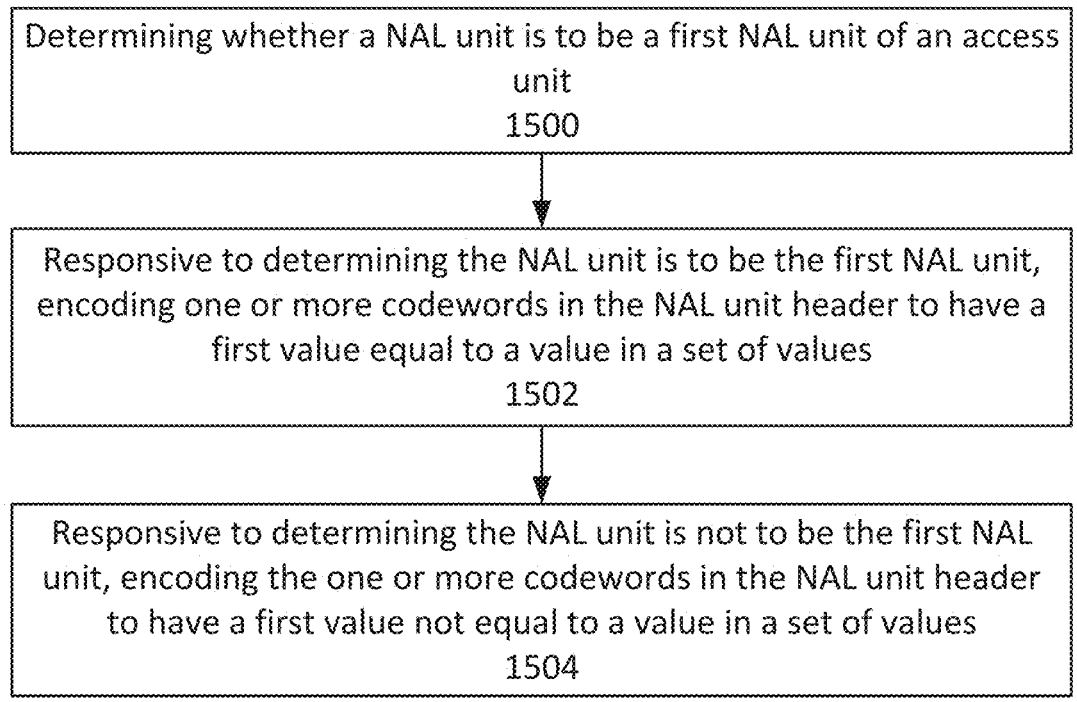

FIG. 15 illustrates operations of the encoder 400 in this embodiment. The processing circuitry 501 may determine in operation 1500 whether a network abstraction layer, NAL, unit is to be a first NAL unit of an access unit.

In operation 1502, the processing circuitry 501 may, responsive to determining the NAL unit is to be the first NAL unit, encode one or more codewords in a NAL unit header of the NAL unit to have a first value equal to a value in a set of values. The one or more codewords may be a flag and the value of the flag is the first value.

In operation 1504, the processing circuitry 501 may, responsive to determining the NAL unit is not to be the first NAL unit, encode the one or more codewords tin the NAL unit header to have a first value not equal to the value in the set of values.

In a third embodiment, the presence of AUD NAL units in the rest of the CVS is signaled in the AUD NAL unit of the first access unit. In one version of this embodiment, the first NAL unit in the CVS is always an AUD NAL unit and a codeword, e.g. a flag, is used to determine if the following access units start with an AUD NAL unit or not.

In a preferred version the flag may only be set if each of the following access units in decoding order in the CVS only comprises one NAL unit. In another preferred version the flag is only present in the first NAL unit of the CVS. In another version the flag is required to have a specific value if the NAL unit is not the first NAL unit of the CVS. In another version the flag may be set on or off for any AUD NAL unit in the CVS. In this case, the indication specifies the presence of access unit delimiters in the following NAL units in the decoding order in the CVS until the end of the CVS or a new AUD NAL unit is decoded with a new flag overriding the previous value of the flag.

Below is example syntax and semantics for this third embodiment.

| | Descriptor |
|---|---|
| access_unit_delimiter_rbsp( ) { | |
|   pic_type | u(3) |
|   presence_of_access_unit_delimeters_in_following_access_units_in_cvs_flag | u(1) |
|   rbsp_trailing_bits( ) | |
| } | |

The presence_of_access_unit_delimiters_in_following_access_units_in_cvs_flag equal to 1 indicates that an access unit delimiter NAL unit is present for all access units in the CVS following the current access unit in decoding order. The presence_of_access_unit_delimeters_in_following_access_units_in_cvs_flag equal to 0 indicates that an access unit delimiter NAL unit may or may not be present for access units in the CVS following the current access unit in decoding order.

One or several of the following restrictions may apply:

It is a requirement for bitstream conformance that the first access unit in a CVS starts with an access unit delimiter NAL unit.

An access unit comprising more than one NAL unit must start with an access unit delimiter.

Figure 9:
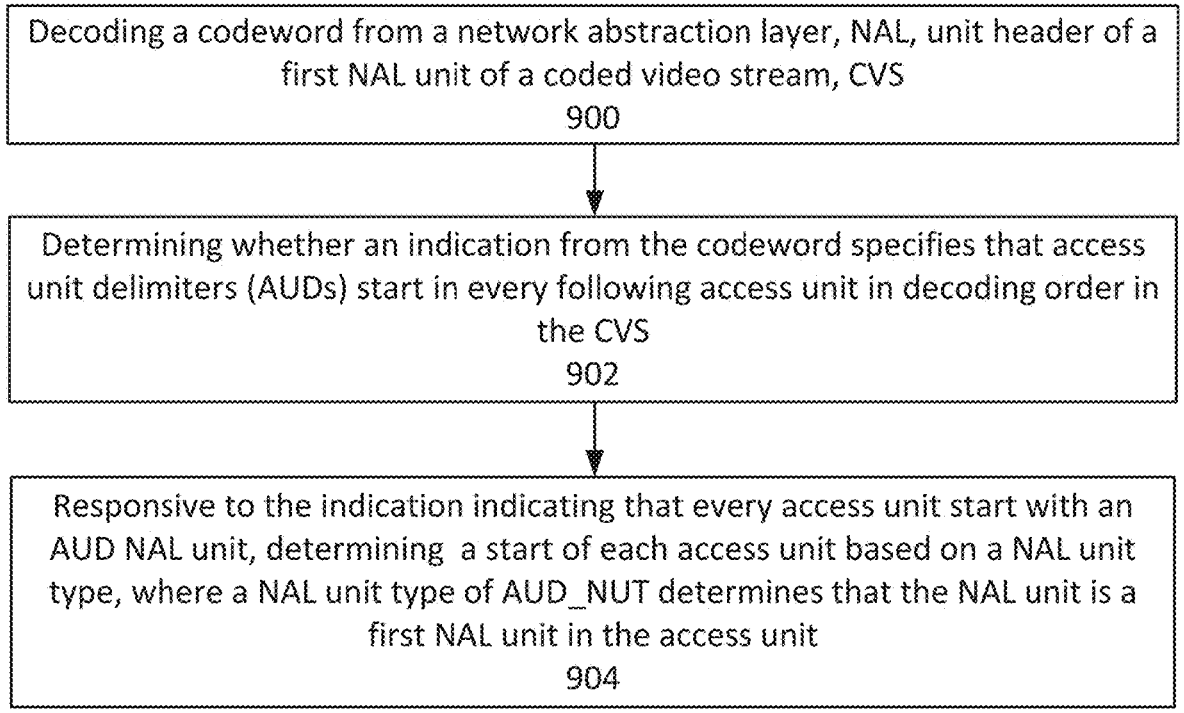
Figure 16:
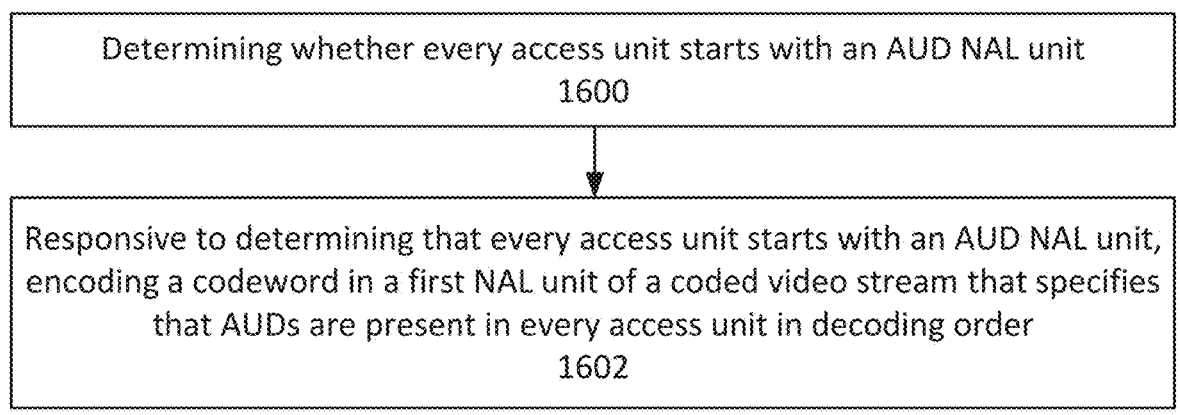
Figure 11:
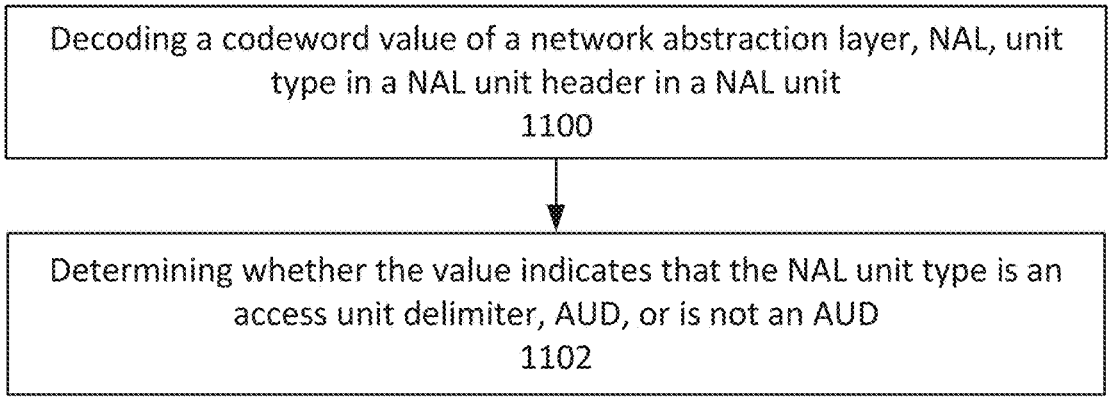

A decoder may perform all or a subset of the following steps:

1. Decode a first NAL unit of a CVS, where the first NAL unit is an AUD NAL unit
2. Decode a codeword (e.g. a flag) from the first NAL unit
3. Determine an indication from the codeword that specifies whether access unit delimiters are present in the following access units in decoding order in the CVS or not
4. If the indication indicates that every access unit shall start with an AUD NAL unit
   a. Determine the start of each access unit based on the NAL unit type, where a NAL unit type of AUD_NUT determines that the NAL unit is the first NAL unit in the access unit
5. else if the indication indicates that every access unit may or may not start with an AUD NAL unit determine the start of each access unit by other means FIG. 9 illustrates operations of the decoder 406. In operation 900, the processing circuitry 601 may decode a codeword from a network abstraction layer, NAL, unit header of a first NAL unit of a coded video stream, CVS.

In operation 902, the processing circuitry 601 may determine whether an indication from the codeword specifies that access unit delimiters (AUDs) starts in every following access unit in decoding order in the CVS.

In operation 904, the processing circuitry 601 may, responsive to the indication indicating that every access unit start with an AUD NAL unit, determine a start of each access unit based on a NAL unit type, where a NAL unit type of AUD NUT (access unit delimiter NAL unit type) determines that the NAL unit is a first NAL unit in the access unit.

FIG. 15 illustrates operations of the encoder 400. In operation 1500, the processing circuitry 501 may determine if every access unit starts with an access unit delimiter (AUD) NAL unit. Responsive to determining that every access unit starts with an AUD NAL unit, the processing circuitry 501 in operation 1502 may encode a codeword in a first NAL unit of a coded video stream that specifies that AUDs are present in every access unit in decoding order.

In a fourth embodiment, the presence of AUD NAL units in the following access units in decoding order in the rest of the CVS is indicated with a codeword in a parameter set. In the preferred version, the parameter set is SPS. In other versions the parameter set is a picture parameter set (PPS), an adaptive parameter set (APS), a decoder parameter set (DPS), or a picture header.

In this fourth embodiment, syntax is added to the parameter set that indicates whether there are AUD NAL units in the access units following the current access unit in decoding order in the CVS, or not. In one version of this embodiment the SPS NAL unit is the first NAL unit in the CVS. A second syntax may be present in the parameter set that indicates the number of NAL units in the first access unit. In another version of the embodiment, the AUD is the first NAL unit in the first access unit. In yet another version, an AUD NAL unit is the last NAL unit of the access unit. Below is example syntax for embodiment:

| | Descriptor |
|---|---|
| seq_parameeter_set( ) { | |
|   ... | |
|   access_unit_delimeters_is_present_in_following_access_units_in_cvs_flag | u(1) |
|   if (!access_unit_delimeters_is_present_in_following_access_units_in_cvs_flag ) | |
|     number_of_nal_units_in_current_access_unit | ue(v) |
| } | |

In another version of the embodiment, the presence of AUD NAL units in the access units following the current access unit in decoding order in the CVS is indicated with a specific value of NAL unit type in a NAL unit header in a NAL unit, preferably the first NAL unit in the CVS.

For instance, if SPS is the first NAL unit in the CVS, one of two or more values of NAL unit type is used to express that the NAL unit is the NAL unit header where the two or more NAL unit types for SPS express whether the access units following the current access unit in decoding order in the CVS starts with an AUD NAL unit or not. Example NAL unit types for SPS:

---
SPS_AUD_NALU_IN_ALL_FOLLOWING_AUS_IN_CVS_NUT
SPS_AUD_NALU_OPTIONAL_IN_CVS_NUT

---

FIG. 10 illustrates operations of the decoder 406. In operation 1000, the processing circuitry 601 may decode an value of a network abstraction layer, NAL unit type in a NAL unit header in a NAL unit. In operation 1002, the processing circuitry 601 may determine whether the value indicates that access unit delimiter (AUD) NAL units are present in access units following a current access unit in decoding order in the CVS.

FIG. 17 illustrates operations of the encoder 400. In operation 1700, the encoder determines whether access unit delimiter, AUD, network abstraction layer, NAL, units are to be present in access units following a current access unit in decoding order.

In operation 1702, responsive to determining that AUD NAL units are to be present, the processing circuitry 501 encodes a value of a NAL unit type in a NAL unit header of a NAL unit in the video stream being encoded to indicate that AUD NAL units are to be present in access units following the current access unit in decoding order.

FIG. 21 illustrates operations of the decoder 406 when a syntax element is added to a parameter set. In operation 2100, the processing circuitry 601 decodes a value of a syntax element in a parameter set, the value indicating whether there are AUD NAL units in access units following a current access unit in decoding order in a CVS. In operation 2102, the processing circuitry 601 determines whether the value indicates that there are AUD NAL units in the access units following the current access unit in decoding order in the CVS. For example, the processing circuitry 601 can determine whether there are AUD NAL units in the access units following the current access unit in decoding order in the CVS based on a specific value of NAL unit type. In operation 2104, the processing circuitry 601 can determine from a syntax element in the parameter set a number of NAL units in a first access unit. Various operations from the flow chart of FIG. 21 may be optional with respect to some embodiments of decoders and related methods. For example, the operations of block 2104 of FIG. 21 may be optional.

FIG. 22 illustrates operations of the encoder 400 when adding the syntax element to a parameter set. In operation 2200, the processing circuitry 501 determines whether access unit delimiter (AUD) network abstraction layer (NAL) units are to be present in access units following a current access unit in decoding order in a coded video stream (CVS). In operation 2202, the processing circuitry 501, responsive to determining that AUD NAL units are to be present in access units following the current access unit in decoding order, encodes a value of a syntax element in a parameter set of the coded video stream, the value indicating that there are AUD NAL units in access units following the current access unit in decoding order. For example, the processing circuitry 501 may, responsive to determining that AUD NAL units are to be present in access units following the current access unit in decoding order, encode a specific value of NAL unit type in a NAL unit header. In operation 2204, the processing circuitry 501 may encode a value of a second syntax element in the parameter set, the value of the second syntax element indicating a number of NAL units in a first access unit. Various operations from the flow chart of FIG. 22 may be optional with respect to some embodiments of encoders and related methods. For example, the operations of block 2204 of FIG. 22 may be optional.

In a fifth embodiment the AUD may be signaled in the NAL unit type codeword in the NAL unit header.

In one version of this embodiment, two NAL unit types are used for each current NAL unit type that may start an AU. For instance:

---
SPS_AUD_NUT
SPS_NO_AUD_NUT
PPS_AUD_NUT
PPS_NO_AUD_NUT
TRAIL_AUD_NUT
TRAIL_NO_AUD_NUT

---

Any of the NAL unit types in Table 6 may be used to indicate AUD_NUT or NO_AUD_NUT except for the NAL unit types 2 and 3 of Table 6. One of each of the two NAL_unit_type for each current NAL unit type indicates that the NAL unit type is an AUD. The other one of each of the two NAL_unit_type for each current NAL unit type indicates that the NAL unit type is not an AUD.

In a sixth embodiment, a set of values may be used to signal the AUD. In this embodiment, a decoder 406 derives the start of an access unit from one or more syntax elements in a video bitstream. First, the one or more syntax elements are decoded and a first value is derived from the decoded one or more syntax elements. Then, the first value is compared against the values of a predetermined set of values where the set consist of at least two values. If the first value is equal to one of the values in the predetermined set of values, the decoder determines that an access unit boundary is indicated.

In one version of this embodiment, the comparison of the first value against a predetermined set of values may consist of determining whether the first value is within a predetermined range of values. This determination may be done by one or both of the following:

Determining whether the first value is larger than or equal to a first predetermined threshold value Determining whether the first value is smaller than or equal to a second predetermined threshold value The one or more syntax elements may be syntax elements in a NAL unit header.

Figure 12:
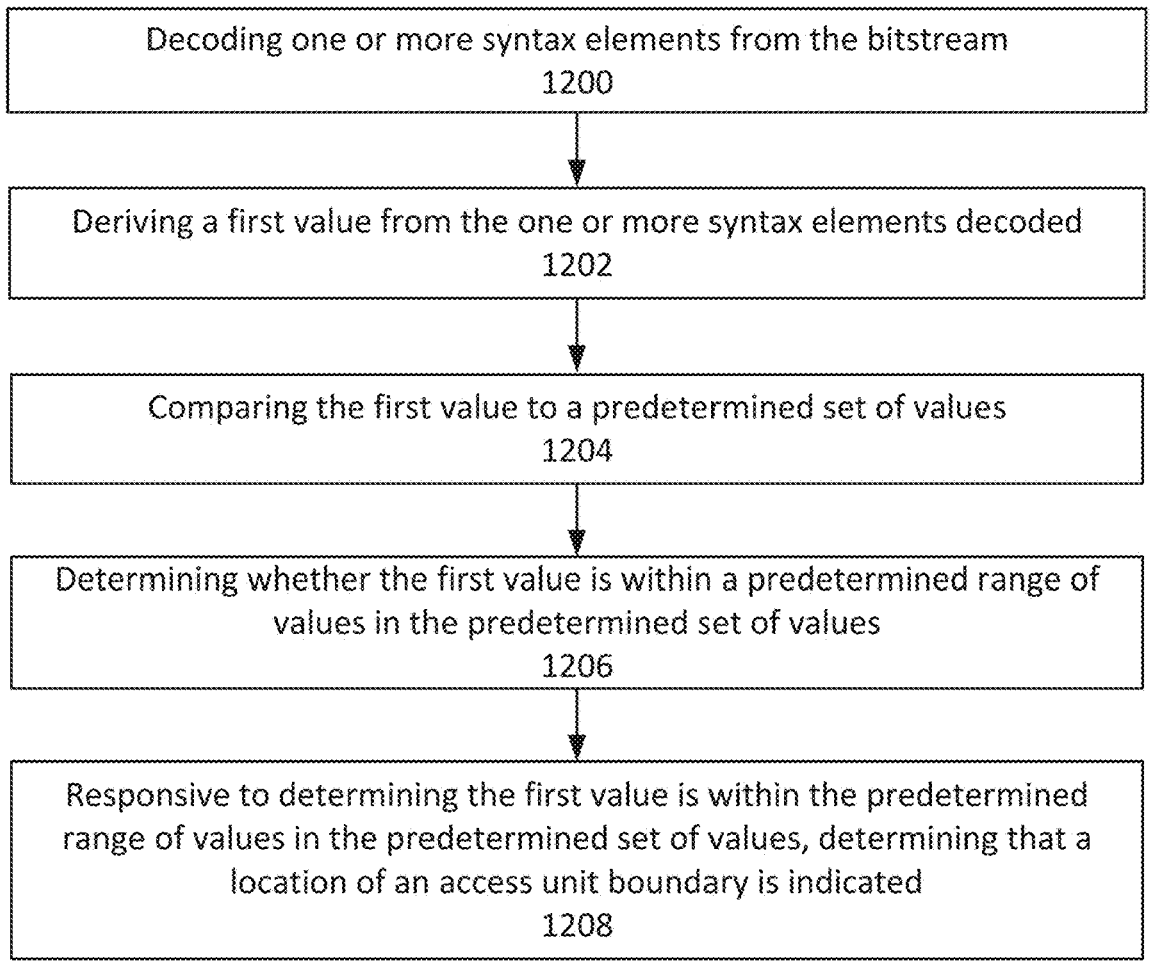
Figure 18:
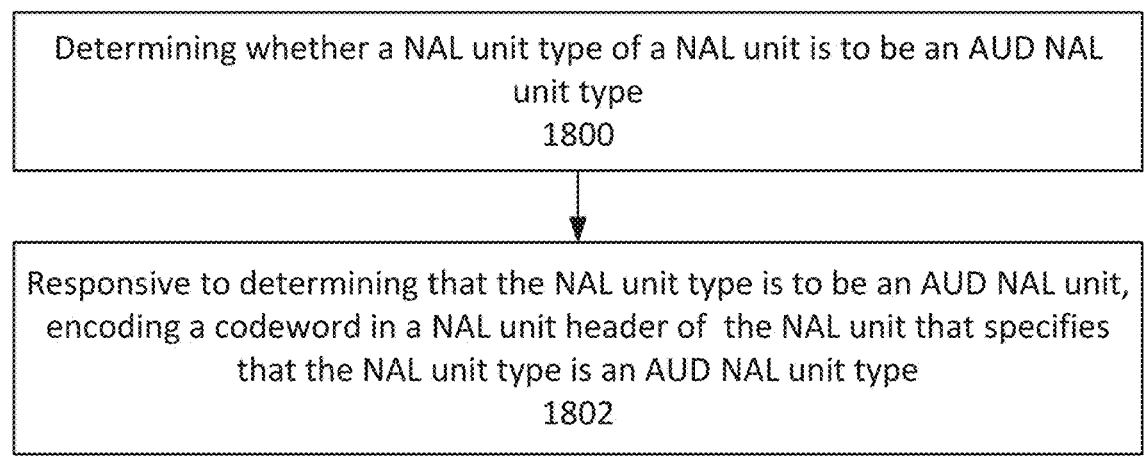

FIG. 12 illustrates operation of decoder 406 in this sixth embodiment. In operation 1200, the processing circuitry 601 may decode one or more syntax elements from a received bitstream. The one or more syntax elements may be syntax elements in a NAL unit header. In operation 1202, the processing circuitry 601 may derive a first value from the one or more syntax elements decoded.

In operation 1204, the processing circuitry 601 may compare the first value to a predetermined set of values that comprises at least two values. The comparison of the first value against a predetermined set of values may consist of the processing circuitry 601 determining whether the first value is within a predetermined range of values.

In operation 1206, the processing circuitry 601 may determine whether the first value is within a predetermined range of values in the predetermined set of values. In determining the first value is within the predetermined range of values, the processing circuitry 601 in one embodiment may determine whether the first value is larger than or equal to a first predetermined threshold value. In another embodiment, the processing circuitry may determine whether the first value is smaller than or equal to a second predetermined threshold value.

In operation 1208, responsive to determining the first value is within the predetermined range of values in the predetermined set of values, the processing circuitry 601 may determine that a location of an access unit boundary is indicated.

Figure 19:
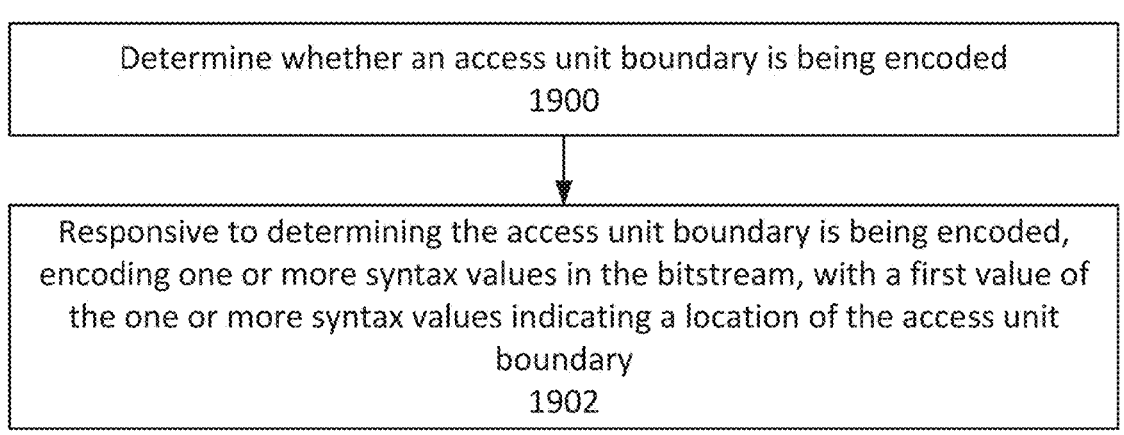

Turning to FIG. 19, operations of encoder 400 in an exemplary embodiment are illustrated. In operation 1900, the processing circuitry 501 may determine whether an access unit boundary is being encoded. In operation 1902, responsive to an access unit boundary is being encoded, the processing circuitry 501 may encode one or more syntax values in the bitstream, with a first value of the one or more syntax values indicating a location of the access unit boundary.

In a seventh embodiment, the AU delimiter NAL unit design may consist of signaling a NAL unit type in 1-byte NAL unit header. In this embodiment, the AU delimiter NAL unit design may consist of signaling a NAL unit type in a first part of the NAL unit header. If the NAL unit type is not an AU delimiter type, a NAL unit header extension is present.

One example of such a design on top of the HEVC NAL unit header design is shown in Table 8

TABLE 8

A 1-byte NAL unit header for AUD

| | Descriptor |
|---|---|
| nal_unit_header( ) { | |
|   forbidden_zero_bit | f(1) |
|   nal_unit_type | u(6) |
|   nuh_layer_id_first_bit | u(1) |
|   if( nal_unit_type != AUD ) { | |
|     nuh_layer_id | u(5) |
|     nuh_temporal_id_plus1 | u(3) |
|   } | |
| } | |

A decoder may perform all of a subset of the following steps in this embodiment:
- derive a first value from one or more syntax element in a first part of a NAL unit header
- If the first value is equal to a value in a predetermined set of values, determine that a NAL unit header extension is not present and determine that the NAL unit containing the NAL unit header is the first NAL unit in an access unit
- If the first value is not equal to a value in a predetermined set of values, determine that a NAL unit header extension is present, decode the syntax element in the NAL unit header extension, and determine that the NAL unit containing the NAL unit header is not the first NAL unit in an access unit.

The predetermined set of values may in this embodiment be a set consisting of only one value.

Figure 13:
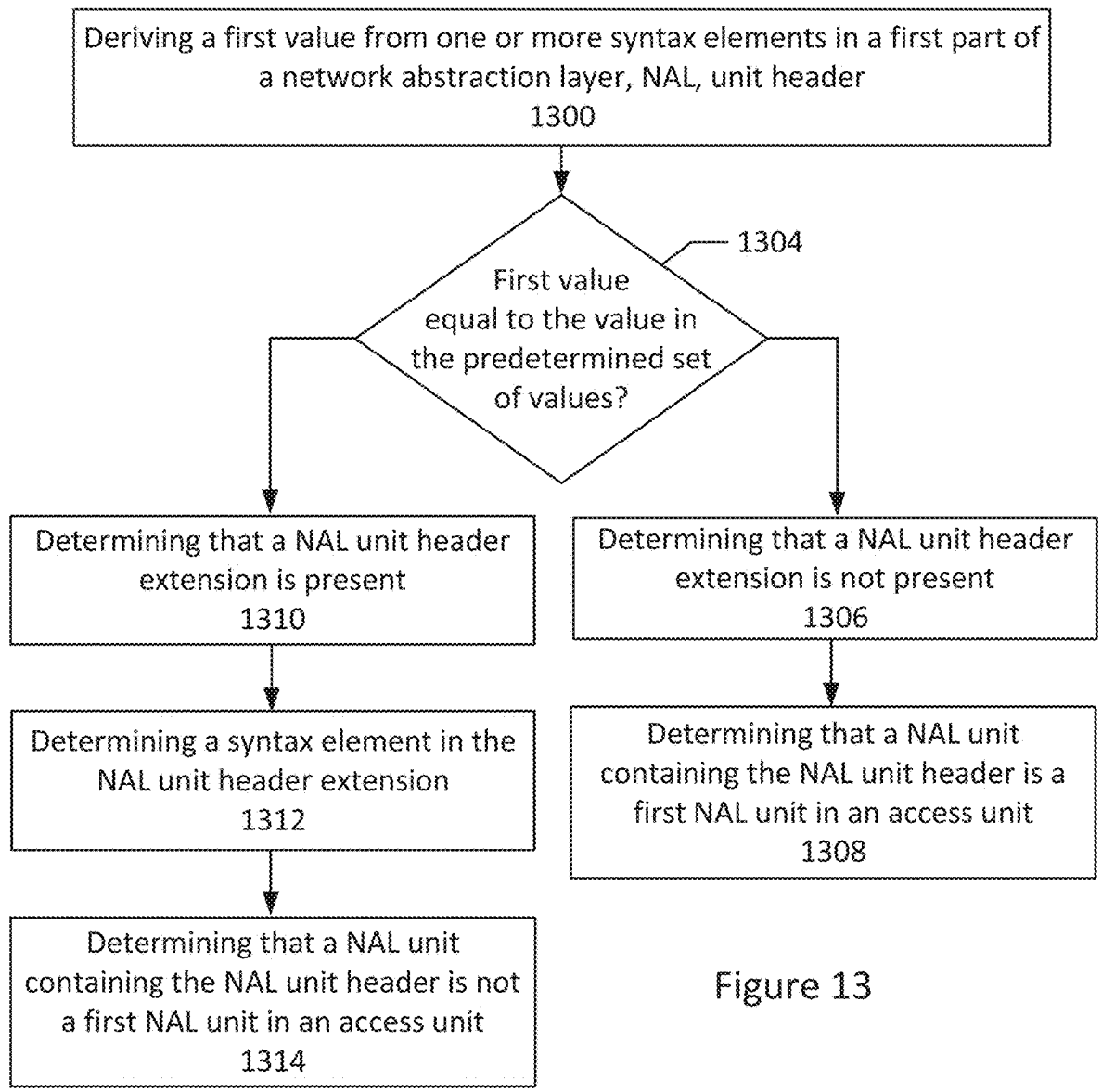

Turning to FIG. 13, operations of decoder 406 in this seventh embodiment are illustrated. In operation 1300, the processing circuitry 601 may derive a first value from one or more syntax elements in a first part of a network abstraction layer, NAL, unit header. In operation 1302, the processing circuitry 601 may determine whether the first value is equal to a value in a predetermined set of values.

Responsive to determining that the first value is equal to the value in the predetermined set of values, the processing circuitry 601 may determine in operation 1306 that a NAL unit header extension is not present and determine in operation 1308 that a NAL unit containing the NAL unit header is a first NAL unit in an access unit.

Responsive to determining that the first value is not equal to the value in the predetermined set of values, the processing circuitry 601 may determine in operation 1310 that a NAL unit header extension is present, determine in operation 1312 that a syntax element is in the NAL unit header extension, and determine in operation 1314 that the NAL unit containing the NAL unit header is not the first NAL unit in an access unit.

Figure 20:
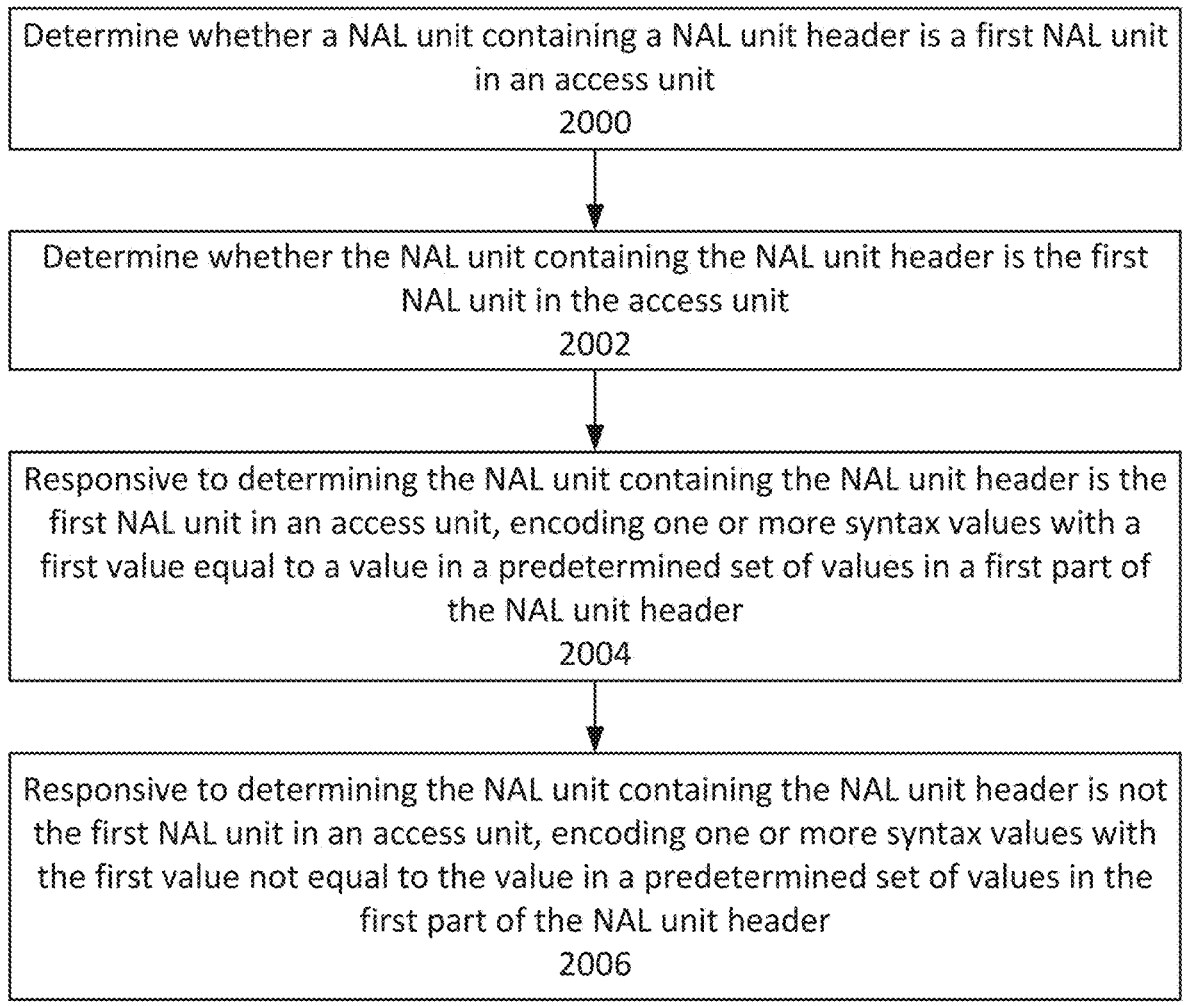

Turning to FIG. 20, operations of encoder 400 in an exemplary embodiment are illustrated. In operation 2000, the processing circuitry 501 can determine whether a network abstraction layer, NAL, unit containing a NAL unit header is a first NAL unit in an access unit. In operation 2002, responsive to determining the NAL unit containing the NAL unit header is the first NAL unit in the access unit, the processing circuitry 501 may encode one or more syntax elements with a first value equal to a value in a predetermined set of values in a first part of the NAL unit header. In operation 2004, responsive to determining the NAL unit containing the NAL unit header is not the first NAL unit in the access unit, the processing circuitry 501 may encode one or more syntax elements with a first value not equal to the value in a predetermined set of values in the first part of the NAL unit header.

LISTING OF EMBODIMENTS

Embodiment 1. A method performed by a decoder to decode a bitstream, the method comprising:
- decoding (1000) one or more syntax elements from the bitstream;
- deriving (1002) a first value from the one or more syntax elements;
- comparing (1004) the first value to a predetermined set of values that comprises at least two values;
- determining (1006) whether the first value is within a predetermined range of values in the predetermined set of values; and
- responsive to determining the first value is within the predetermined range of values in the predetermined set of values, determining (1008) that a location of an access unit boundary is indicated.

Embodiment 2. The method of Embodiment 1 wherein determining whether the first value is within the predetermined range of values in the predetermined set of values comprises:
- determining whether the first value is equal to a value in the predetermined range of values.

Embodiment 3. The method of any of Embodiments 1-2 wherein determining whether the first value is within the predetermined range of values comprises determining whether the first value is larger than or equal to a first predetermined threshold value.

Embodiment 4. The method of any of Embodiments 1-2 wherein determining whether the first value is within the predetermined range of values comprises determining whether the first value is smaller than or equal to a second predetermined threshold value.

Embodiment 5. A method performed by a decoder, the method comprising:
- deriving (1300) a first value from one or more syntax elements in a first part of a network abstraction layer, NAL, unit header;
- determining (1302) whether the first value is equal to a value in a predetermined set of values;
- responsive to determining (1304) the first value is equal to the value in the predetermined set of values:
- determining (1306) that a NAL unit header extension is not present; and
- determining (1308) that a NAL unit containing the NAL unit header is a first NAL unit in an access unit.

Embodiment 6. The method of Embodiment 5, further comprising:
- responsive to determining (1304) the first value is not equal to the value in the predetermined set of values:
- determining (1310) that a NAL unit header extension is present;
- decoding (1312) a syntax element in the NAL unit header extension; and
- determining (1314) that the NAL unit containing the NAL unit header is not the first NAL unit in an access unit.

Embodiment 7. A method performed by a decoder, the method comprising:
- decoding (700) a codeword from a network abstraction layer, NAL, unit header of a first NAL unit; and
- determining (704) whether the code word indicates a start of an access unit by:
  - determining (706) that the first NAL unit is a first NAL unit of an access unit responsive to the codeword being equal to one or more specified values; and
  - determining (708) that the first NAL unit is not a first NAL unit of an access unit responsive to the codeword being equal to one or more different specified values.

Embodiment 8. The method of Embodiment 7 wherein the codeword comprises a flag.

Embodiment 9. The method of any of Embodiments 7-8 wherein the codeword indicates one or more features of an access unit delimiter.

Embodiment 10. The method of Embodiment 9 where the one or more features may be one or more of a start of the access unit, an end of the access unit, a start of a CVS, an end of a CVS, a first VCL NAL unit in the access unit, a last VCL NAL unit in the access unit, a start of the access unit of the current layer, an end of the access unit of the current layer, a number of NAL units in the access unit, a number of VCL NAL units in the access unit, or a number of non-VCL NAL units in the access unit.

Embodiment 11. A method performed by a decoder, the method comprising:
- deriving (800) a first value from one or more codewords in a payload of a network abstraction layer, NAL, unit of a bitstream;
- responsive to determining the first value is equal to a value in a set of values, determining (802) that the NAL unit is a first NAL unit of an access unit; and
- responsive to determining the first value is not equal to the value in the set of values, determining (804) that the NAL unit is not the first NAL unit of the access unit.

Embodiment 12. The method of Embodiment 11 wherein the one or more codewords comprises a flag and a value of the flag comprises the first value.

Embodiment 13. The method of any of Embodiments 11-12 wherein a presence of the one or more codewords in the payload of the NAL unit is conditioned on a value of one or more codewords in at least one other part of the bit stream.

Embodiment 14. A method performed by a decoder, the method comprising:
- decoding (900) a codeword from a network abstraction layer, NAL, unit header of a first NAL unit of a coded video stream, CVS;
- determining (902) whether an indication from the codeword specifies that access unit delimiters (AUDs) start in every following access unit in decoding order in the CVS; and
- responsive to the indication indicating that every access unit start with an AUD NAL unit, determining (904) a start of each access unit based on a NAL unit type, where a NAL unit type of access unit delimiter NAL unit type, AUD NUT, determines that the NAL unit is a first NAL unit in the access unit.

Embodiment 15. The method of Embodiment 14 wherein the codeword comprises a flag.

Embodiment 16. A method performed by a decoder, the method comprising:
- decoding (1000) a value of a network abstraction layer, NAL unit type in a NAL unit header in a NAL unit of a coded video stream, CVS; and
- determining (1002) whether the value indicates that access unit delimiter (AUD) NAL units are present in access units following a current access unit in decoding order in the CVS.

Embodiment 17. A method performed by a decoder, the method comprising:
- decoding (1100) a codeword value of a network abstraction layer, NAL unit type in a NAL unit header in a NAL unit; and
- determining (1102) whether the value indicates that the NAL unit type is an access unit delimiter, AUD, or is not an AUD.

Embodiment 18. A decoder for a communication network, the decoder (406) comprising:
- a processor (601); and
- memory (603) coupled with the processor, wherein the memory comprises instructions that when executed by the processor cause the processor to perform operations according to any of Embodiments 1-17.

Embodiment 19. A computer program comprising computer-executable instructions configured to cause a device to perform the method according to any one of Embodiments 1-17, when the computer-executable instructions are executed on a processor (601) comprised in the device.

Embodiment 20. A computer program product comprising a computer-readable storage medium (603), the computer-readable storage medium having computer-executable instructions configured to cause a device to perform the method according to any one of Embodiments 1-17 when the computer-executable instructions are executed on a processor (601) comprised in the device.

Embodiment 21. An apparatus comprising:
- at least one processor (601);
- memory (603) communicatively coupled to the processor, said memory comprising instructions executable by the processor, which cause the processor to perform operations comprising operations according to any of Embodiments 1-17.

Embodiment 22. A method performed by an encoder, the method comprising:
  determining (1700) whether an access unit boundary is being encoded; and
  responsive to an access unit boundary being encoded, encoding (1702) one or more syntax values in the bitstream, with a first value of the one or more syntax values indicating a location of the access unit boundary.

Embodiment 23. A method performed by an encoder, the method comprising:
  determining (2000) whether a network abstraction layer, NAL, unit containing a NAL unit header is a first NAL unit in an access unit;
  responsive to determining (2002) the NAL unit containing the NAL unit header is the first NAL unit in the access unit, encoding (2004) one or more syntax elements with a first value equal to a value in a predetermined set of values in a first part of the NAL unit header; and
  responsive to determining (2002) the NAL unit containing the NAL unit header is not the first NAL unit in the access unit, encoding (2006) one or more syntax elements with the first value not equal to the value in a predetermined set of values in the first part of the NAL unit header and encoding syntax elements in a NAL unit header extension.

Embodiment 24. The method of Embodiment 23 wherein the predetermined set of values comprises only one value.

Embodiment 25. A method performed by an encoder, the method comprising:
  determining (1400) whether the network abstraction layer, NAL, unit is a first NAL unit of an access unit;
  responsive to determining the NAL unit is the first NAL unit of the access unit, encoding (1402) one or more codewords in a payload of the NAL unit header to have a value first indicating the NAL unit is the first NAL unit of the access unit; and
  responsive to determining the NAL unit is not the first NAL unit of the access unit, encoding (1404) a different codeword in the NAL unit header indicating the NAL unit head is not the first NAL unit of the access unit.

Embodiment 26. A method performed by an encoder, the method comprising:
  determining (1500) whether a network abstraction layer, NAL, unit is to be a first NAL unit of an access unit;
  responsive to determining the NAL unit is to be the first NAL unit, encoding (1502) one or more codewords in a NAL unit header of the NAL unit to have a first value equal to a value in a set of values; and
  responsive to determining the NAL unit is not to be the first NAL unit, encoding (1504) the one or more codewords tin the NAL unit header to have a first value not equal to the value in the set of values.

Embodiment 27. The method of Embodiment 16 wherein the one or more codewords comprises a flag and the first value is a value of the flag.

Embodiment 28. A method performed by an encoder, the method comprising:
  determining (1600) whether every access unit starts with an access unit delimiter, AUD, network abstract layer, NAL, unit; and
  responsive to determining that every access unit starts with an AUD NAL unit, encoding (1602) a codeword in a first NAL unit of a coded video stream that specifies that AUDs are present in every access unit in decoding order.

Embodiment 29. A method performed by an encoder, the method comprising:
  determining (1700) whether access unit delimiter, AUD, network abstraction layer, NAL, units are to be present in access units following a current access unit in decoding order; and
  responsive to determining that AUD NAL units are to be present, encoding (1702) a value of a NAL unit type in a NAL unit header of a NAL unit in the video stream being encoded to indicate that AUD NAL units are to be present in access units following the current access unit in decoding order.

Embodiment 30. A method performed by an encoder, the method comprising:
  determining (1800) whether a network abstract layer, NAL, unit type of a NAL unit is to be an access unit delimiter, AUD, NAL, unit type; and
  responsive to determining that the NAL unit type is to be an AUD NAL unit, encoding (1802) a codeword in a first NAL unit of a coded video stream that specifies that the NAL unit type is an AUD NAL unit type.

Embodiment 31. An encoder for a communication network, the encoder (200) comprising:
  a processor (501); and
  memory (503) coupled with the processor (501), wherein the memory (503) comprises instructions that when executed by the processor (501) cause the processor (501) to perform operations according to any of Embodiments 22-30.

Embodiment 32. A computer program comprising computer-executable instructions configured to cause a device to perform the method according to any one of Embodiments 22-30, when the computer-executable instructions are executed on a processor (501) comprised in the device.

Embodiment 33. A computer program product comprising a computer-readable storage medium (503), the computer-readable storage medium having computer-executable instructions configured to cause a device to perform the method according to any one of Embodiments 22-30 when the computer-executable instructions are executed on a processor (501) comprised in the device.

Embodiment 34. An apparatus comprising:
  at least one processor (501);
  memory (503) communicatively coupled to the processor, said memory comprising instructions executable by the processor, which cause the processor to perform operations comprising operations according to any of Embodiments 22-30.

Explanations for abbreviations from the above disclosure are provided below.

| Abbreviation | Explanation |
| --- | --- |
| AU | Access Unit |
| AUD | Access Unit Delimiter |
| APS | Adaptive Parameter Set |
| CVS | Coded Video Stream |
| DPS | Decoder Parameter Set |
| HEVC | High Efficiency Video Coding |
| PPS | Picture Parameter Set |
| NAL | Network Abstraction Layer |
| NALU | NAL unit |
| NUT | NAL unit type |

-continued

| Abbreviation | Explanation |
| --- | --- |
| SEI | Supplemental Enhancement Information |
| SPS | Sequence Parameter Set |
| VCL | Video Coding Layer |
| VVC | Versatile Video Coding |

Further definitions are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a decoder, the method comprising:
    decoding a value from a syntax element in a parameter set, the value indicating whether there are access unit delimiter, AUD, network abstraction layer, NAL units in the access units following a current access unit in decoding order in a coded video stream, CVS; and
    determining whether the value indicates that there are AUD NAL units in the access units following the current access unit in decoding order in the CVS.

2. The method of claim 1, further comprising determining from a syntax element in the parameter set a number of NAL units in a first access unit.

3. The method of claim 1, further comprising determining whether there are AUD NAL units in the access units following the current access unit in decoding order in the CVS based on a specific value of NAL unit type.

4. A decoder comprising:
    at least one processor;
    memory communicatively coupled to the at least one processor, said memory comprising instructions executable by the at least one processor, which cause the at least one processor to perform operations comprising:
        decoding a value from a syntax element in a parameter set, the value indicating whether there are access unit delimiter, AUD, network abstraction layer, NAL units in the access units following a current access unit in decoding order in a coded video stream, CVS; and
        determining whether the value indicates that there are AUD NAL units in the access units following the current access unit in decoding order in the CVS.

5. The decoder of claim 4, further comprising determining from a syntax element in the parameter set a number of NAL units in a first access unit.

6. The decoder of claim 4, further comprising determining whether there are AUD NAL units in the access units following the current access unit in decoding order in the CVS based on a specific value of NAL unit type.

7. A method performed by an encoder, the method comprising:
    determining whether access unit delimiter, AUD, network abstraction layer, NAL, units are to be present in access units following a current access unit in decoding order in a coded video stream, CVS; and
    responsive to determining that AUD NAL units are to be present in access units following the current access unit in decoding order, encoding a value of a syntax element in a parameter set of the coded video stream, the value indicating that there are AUD NAL units in access units following the current access unit in decoding order.

8. The method of claim 7, further comprising encoding a value of a second syntax element in the parameter set, the value of the second syntax element indicating a number of NAL units in a first access unit.

9. The method of claim 7, further comprising responsive to determining that AUD NAL units are to be present in access units following the current access unit in decoding order, encoding a specific value of NAL unit type in a NAL unit header.

10. An encoder comprising:
    at least one processor;
    memory communicatively coupled to the processor, said memory comprising instructions executable by the processor, which cause the processor to perform operations comprising:
        determining whether access unit delimiter, AUD, network abstraction layer, NAL, units are to be present in access units following a current access unit in decoding order in a coded video stream, CVS; and
        responsive to determining that AUD NAL units are to be present in access units following the current access unit in decoding order, encoding a value of a syntax element in a parameter set of the CVS, the value indicating that there are AUD NAL units in access units following the current access unit in decoding order.

11. The encoder of claim 10, wherein the memory comprises further instructions executable by the processor, which when executed, cause the processor to perform operations further comprising encoding a value of a second syntax element in the parameter set, the value of the second syntax element indicating a number of NAL units in a first access unit.

12. The encoder of claim 10, wherein the memory comprises further instructions executable by the processor, which when executed, cause the processor to perform operations further comprising responsive to determining that AUD NAL units are to be present in access units following the current access unit in decoding order, encoding a specific value of NAL unit type in a NAL unit header.

* * * * *